US008335184B2

(12) United States Patent
Okuda

(10) Patent No.: US 8,335,184 B2
(45) Date of Patent: Dec. 18, 2012

(54) WIRELESS BANDWIDTH ALLOCATING METHOD AND WIRELESS BASE STATION

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 737 days.

(21) Appl. No.: 12/230,305

(22) Filed: Aug. 27, 2008

(65) Prior Publication Data

US 2009/0116436 A1    May 7, 2009

(30) Foreign Application Priority Data

Nov. 1, 2007  (JP) ................................. 2007-285494

(51) Int. Cl.
*H04W 72/00* (2009.01)
*G06F 15/16* (2006.01)

(52) U.S. Cl. ........ 370/329; 370/203; 370/232; 370/233; 455/450; 455/452.2; 455/453; 709/231; 709/233; 709/247

(58) Field of Classification Search .......... 370/228–463; 455/450–455; 709/231–247
See application file for complete search history.

(56) References Cited

U.S. PATENT DOCUMENTS

| | | | |
|---|---|---|---|
| 5,963,557 A * | 10/1999 | Eng ................................ | 370/432 |
| 6,657,983 B1 * | 12/2003 | Surazski et al. ............... | 370/337 |
| 6,697,331 B1 * | 2/2004 | Riihinen et al. ............... | 370/236 |
| 6,697,378 B1 * | 2/2004 | Patel .............................. | 370/468 |
| 6,717,948 B1 * | 4/2004 | Subbiah .................... | 370/395.64 |
| 6,789,123 B2 * | 9/2004 | Li et al. ......................... | 709/231 |
| 6,957,071 B1 * | 10/2005 | Holur et al. ................. | 455/452.2 |
| 7,002,933 B1 * | 2/2006 | Poon et al. ..................... | 370/315 |
| 7,289,453 B2 * | 10/2007 | Riedel et al. .................. | 370/252 |
| 7,310,312 B2 * | 12/2007 | Shin .............................. | 370/235 |
| 7,526,297 B1 * | 4/2009 | Holur et al. ................... | 455/466 |
| 7,573,851 B2 * | 8/2009 | Xing et al. .................... | 370/334 |
| 7,599,290 B2 * | 10/2009 | Dos Remedios et al. .. | 370/230.1 |
| 7,630,402 B2 * | 12/2009 | Un et al. ....................... | 370/469 |
| 7,639,712 B2 * | 12/2009 | Un et al. ....................... | 370/469 |
| 7,653,087 B2 * | 1/2010 | Un et al. ....................... | 370/469 |
| 7,668,188 B2 * | 2/2010 | Chang et al. .................. | 370/415 |
| 7,724,721 B2 * | 5/2010 | Lim et al. ...................... | 370/343 |

(Continued)

FOREIGN PATENT DOCUMENTS

WO    2007093879 A2    8/2007

OTHER PUBLICATIONS

IEEE std 802.16 (tm)—2004 for Local and metropolitan area networks; Part 16: Air Interface for Fixed Broadband Wireless Access Systems.

(Continued)

*Primary Examiner* — Ayaz Sheikh
*Assistant Examiner* — Venkatesh Haliyur
(74) *Attorney, Agent, or Firm* — Murphy & King, P.C.

(57) ABSTRACT

A wireless base station for allocating a wireless bandwidth to a wireless terminal based on a bandwidth request from the wireless terminal. The wireless base station includes a receiving part configured to receive a target data transmitted in the allocated wireless bandwidth from the wireless terminal, the target data including one or more user packets on which a combining process or a dividing process is performed and data regarding the combining process or the dividing process and an updating part configured to increase or reduce the total quantity of the allocated wireless bandwidth.

18 Claims, 36 Drawing Sheets

U.S. PATENT DOCUMENTS

| | | | |
|---|---|---|---|
| 7,733,785 B2* | 6/2010 | Andreev et al. | 370/238 |
| 7,925,021 B2* | 4/2011 | Un et al. | 380/264 |
| 8,009,667 B1* | 8/2011 | Stanwood et al. | 370/389 |
| 8,023,410 B2* | 9/2011 | O'Neill | 370/235 |
| 8,189,774 B2* | 5/2012 | Raju et al. | 380/37 |
| 2006/0153152 A1* | 7/2006 | Kondylis et al. | 370/338 |
| 2007/0047432 A1* | 3/2007 | Cho et al. | 370/203 |
| 2007/0060149 A1* | 3/2007 | Lim et al. | 455/445 |
| 2007/0160082 A1* | 7/2007 | Un et al. | 370/469 |
| 2007/0160083 A1* | 7/2007 | Un et al. | 370/470 |
| 2007/0160213 A1* | 7/2007 | Un et al. | 380/270 |
| 2007/0162610 A1* | 7/2007 | Un et al. | 709/230 |
| 2007/0177627 A1* | 8/2007 | Raju et al. | 370/469 |
| 2007/0207782 A1* | 9/2007 | Tran | 455/414.1 |
| 2007/0223469 A1* | 9/2007 | Chandra et al. | 370/389 |
| 2008/0186918 A1* | 8/2008 | Tinnakornsrisuphap et al. | 370/331 |

OTHER PUBLICATIONS

IEEE std 802.16e (tm)—2005 for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1.

Extended European Search Report dated Jun. 16, 2010 received in corresponding European Patent Application No. 08163486.7-1249/2056543.

\* cited by examiner

FIG.3

| UL-MAP message | | |
|---|---|---|
| Field Name | Field Length | Value |
| Management Message Type | 8bit | 3 (INDICATING UL-MAP MESSAGE) |
| Reserved | 8bit | |
| UCD count | 8bit | |
| Allocation Start Time | 32bit | |
| No. OFDMA Symbols | 8bit | Number of Symbols for UL subframe |
| <UL-MAP_IE for OFDMA PHY> | | |
| Field Name | Field Length | Value |
| CID | 16bit | |
| UIUC | 4bit | 14 (INDICATING CDMA_ALLOCATION_IE) |
| <CDMA_Allocation_IE> | 32bit | |
| Field Name | Field Length | Value |
| Duration | 6bit | Number of Slots (INDICATING QUANTITY OF ALLOCATED WIRELESS RESOURCES) |
| UIUC | 4bit | INDICATING MODULATION METHOD & ENCODING METHOD/RATE TO BE USED |
| Repetition Coding Information | 2bit | INDICATING REPETITION CODE |
| Ranging Code | 8bit | INDICATING CDMA CODE INDEX RECEIVED BY BS |
| Ranging Symbol | 8bit | INDICATING WHICH SYMBOL CORRESPONDS TO CODE RECEIVED BY BS |
| Ranging Subchannel | 7bit | INDICATING WHICH SUBCHANNEL CORRESPONDS TO CODE RECEIVED BY BS |
| Bandwidth Request Mandatory | 1bit | INDICATING WHETHER MS TRANSMITS BR HEADER WITH PROVIDED WIRELESS RESOURCE |

FIG. 4

UL-MAP message

| Field Name | Field Length | Value |
|---|---|---|
| Management Message Type | 8bit | 3 (INDICATING UL-MAP MESSAGE) |
| Reserved | 8bit | |
| UCD count | 8bit | |
| Allocation Start Time | 32bit | |
| No. OFDMA Symbols | 8bit | Number of Symbols for UL subframe |

< UL-MAP_IE for OFDMA PHY >

| Field Name | Field Length | Value |
|---|---|---|
| CID | 16bit | INDICATING MS ALLOCATING WIRELESS RESOURCES |
| UIUC | 4bit | INDICATING MODULATION METHOD & ENCODING METHOD/RATE TO BE USED |
| Duration | 10bit | Number of Slots (INDICATING QUANTITY OF ALLOCATED WIRELESS RESOURCES) |
| Repetition Coding Information | 2bit | INDICATING REPETITION CODE |

GMH: Generic MAC Header
PSH: Packing Subheader

| CID | (BR Quantity) [UNIT:BYTE] |
|---|---|
| #100 | 1950 |
| #203 | 540 |
| #478 | 8260 |
| ⋮ | ⋮ |

WIRELESS BANDWIDTH ALLOCATING METHOD AND WIRELESS BASE STATION

BACKGROUND OF THE INVENTION

1. Field of the Invention

The present invention generally relates to a wireless bandwidth allocating method and a wireless base station. For example, a wireless bandwidth allocating method and a wireless base station used for a wireless communications system where user packets are encapsulated and communicated between a wireless base station and a wireless terminal.

2. Description of the Related Art

As an example of a wireless communication system that conducts wireless bandwidth allocation, there is a technology recommended for standardization by the IEEE 802.16 Working Group.

In the IEEE 802.16 Working Group, the technology is referred to as WiMAX (Worldwide Interoperability for Microwave Access) and is describes as Point-to-Multipoint (P-MP) type communication method enabling plural terminals to connect to a wireless base station. IEEE 802.16 describes two specifications of the technology which are IEEE 802.16d mainly used for fixed communications (see IEEE Std 802.16 (tm)-2004) and IEEE 802.16e mainly used for mobile communications (see IEEE Std 802.16e (tm)-2005). Although the specifications describe plural physical layers, OFDM (Orthogonal Frequency Division Multiplexing) or OFDMA (Orthogonal Frequency Division Multiple Access), for example, are mainly used.

FIG. 1 shows a service image of the IEEE 802.16d/e. As shown in FIG. 1, IEEE 802.16d/e is based on P-MP connection where plural mobile stations (MS) (wireless terminals) are connected to a single base station (BS).

In a case where a MS transmits data according to IEEE 802.16, the BS allocates a wireless bandwidth to the MS. In this case, in order for the MS to request allocation of a bandwidth by the BS, the MS transmits a Bandwidth Request CDMA Code (hereinafter referred to as "BR code").

FIG. 2 is a diagram showing a sequence performed until a bandwidth used for transmitting data is actually allocated. In FIG. 2, when the BS receives the BR code from the MS, the BS transmits a UL-MAP message including CDMA_Allocation-IE for allocating a bandwidth enabling the MS to transmit a Bandwidth Request Header (hereinafter referred to as "BR header") to the BS.

When the MS receives the UL-MAP message from the BS and a bandwidth enabling transmission of the BR header is allocated to the MS, the MS transmits the BR header to the BS. The BR header includes a Connection ID (CID) and the amount of data desired to be transmitted (number of bytes). The BS can obtain QoS (Quality of Service) data from the CID. The Qos data are exchanged between the BS and MS at the time of establishing their connection.

Then, the BS determines whether to allocate a data transmission bandwidth (bandwidth for conducting data transmission) requested by the MS with consideration of the obtained QoS data. That is, in a case where the BS receives requests from plural MSs, the BS allocates bandwidths by prioritizing connections requiring a high QoS. The allocation of the bandwidth is conducted with the UL-MAP message. Then, the MS, using the bandwidth allocated with the UL-MAP message, transmits data (MAC-PDU) to the BS.

FIG. 3 shows a format of a UL-MAP message including a CDMA_Allocation_IE. As shown in FIG. 3, a MS, which has transmitted a BR code, determines that a wireless resource has been allocated to the MS itself based on a Ranging Code, a Ranging Symbol, and a Ranging Subchannel included in the CDMA_Allocation_IE.

Meanwhile, since the BS is able to identify a CID requiring a wireless resource when receiving, for example, a BR header from a MS, the BS can allocate a wireless resource with a UL-MAP having a format different from the format of the UL-MAP generated in response to a received BR code.

FIG. 4 shows an example of a UL-MAP message generated in response to, for example, a BR header. By comparing FIG. 3 and FIG. 4, it can be understood that the data allocated in response to the BR header require fewer bits than the data allocated in response to the BR code. Therefore, the overhead of control data can be reduced for the data allocated in response to the BR header.

FIG. 5A shows a format of a BR header, and FIG. 5B shows the meaning of each field of the BR header. As shown in FIGS. 5A and 5B, the BR header is transmitted in units of CIDs and is able to express a request for bandwidth of approximately 524 KB. Furthermore, the type of the request of the BR header may be an incremental type or an aggregate type. The incremental type indicates the amount of data newly requested to be allocated. The aggregate type indicates the total amount requested. The aggregate type BR header is transmitted periodically.

In addition to the main message, the bandwidth request includes a piggyback request (incremental only) according to a Grant Management Subheader.

FIG. 6(A) shows a format of a Grant Management Subheader (PBR: Piggy Back Request) and FIG. 6(B) indicates the meaning of the Grant Management Subheader Field. As shown in the following FIG. 6(C), the PBR, which is added to the data to be transmitted by the MS (i.e. MAC-PDU (Packet Data Unit), is transmitted to the BS.

FIG. 6(C) shows a format of a MAC-PDU. The MAC-PDU has a GMH (Generic MAC Header) located at its prefix. A CRC (Cyclic Redundancy Code) used for detecting bit error is located at the end of the MAC-PDU. The MAC-PDU also has a SDU (Service Data Unit) including user data such as IP (Internet Protocol) packets. The PBR is transmitted between the GMH and the SDU.

The above-described BR header or the PBR is for notifying the BS the number of bytes equivalent to the MAC-PDU to be transmitted. The description "The request shall not include any PHY (physical layer) overhead" corresponding to the BR field in FIG. 5(B) means that incremented data are not accounted for. For example, although the amount of data to be transmitted is increased two times in a case where the encoding rate of the error correction code is 1/2, the incremented part of the increased data is not included in the BR. This is because the encoding rate changes according to the radiowave environment;

In order to efficiently use wireless resources, encapsulation can be performed on the SDU. For example, a packing process can be performed where plural SDUs are stored in a single PDU and transmitted or a fragmentation process can be performed where a single SDU is divided and transmitted as plural PDUs.

In a case of performing the packing process or the fragmentation process, a subheader including a sequence number is inserted in the PDU.

FIG. 7 is a schematic diagram for describing the packing process. In a case of combining (packing) plural MAC-SDUs into a single MAC-PDU, a Packing SubHeader (PSH) is used for adding a control bit indicative of the location of a fragment sequence number of a SDU and an SDU length to the MAC- PDU. SDUs having the same CID are packed into the same PDU. This can be understood since the GMH is shared by the plural SDUs.

There are three types of formats of the packing subheader (PSH) depending on factors such as whether there is an ARQ (Automatic Repeat ReQuest).

The types are an ARQ-enabled connection shown in FIG. 8(A), an ARQ-disabled and Extend-Type connection shown in FIG. 8(B), and an ARQ-Disabled and non-Extended-Type connection shown in FIG. 8(C). FIG. 8(D) is for describing each field of the PSH.

FIG. 9 is a schematic diagram for describing the fragmentation process. In a case of dividing a MAC-SDU into plural MAC-PDUs and transmitting the plural MAC-PDUs, a fragmentation subheader (FSH) is used for adding control bits indicative of a sequence number and the location of a fragment of a SDU and an SDU length to the MAC-PDU.

There are three types of formats of the fragmentation subheader (FSH) depending on factors such as whether there is an ARQ (Automatic Repeat ReQuest).

The types are an ARQ-enabled connection shown in FIG. 10(A), an ARQ-disabled and Extend-Type connection shown in FIG. 10(B), and an ARQ-Disabled and non-Extended-Type connection shown in FIG. 10(C). FIG. 10(D) is for describing each field of the FSH.

Although both the BSN (Block Sequence Number) and the FSN (Fragment Sequence Number) are sequence numbers, the FSN is incremented once with respect to each fragment of MAC-SDU whereas the BSN is not incremented once with respect to each fragment of MAC-SDU.

The MS performs encapsulation (packing (combining)) or fragmentation (dividing) according to wireless resources provided from the BS. Since a single SDU is divided into plural parts and transmitted in a case of performing fragmentation, overhead corresponding to, for example, a header or CRC may be generated.

FIG. 11 shows an exemplary process in which overhead is generated by the performing of fragmentation.

In FIG. 11, the MS requests the BS to allocate wireless resources amounting to a total of 1510 bytes (6 bytes for a header and 4 bytes for a CRC are added to 1500 bytes) for transmitting 1500 bytes of SDU (IP packet).

The BS allocates 500 bytes of wireless resources from its available wireless resources to the MS. At this stage, the BS recognizes that 1010 bytes remain to be allocated. Meanwhile, the MS, having been allocated the wireless resources, divides the SDU into a part of 488 bytes and another part of 1012 bytes. Then, the MS forms a PDU of 500 bytes by adding a header, a FSH, and a CRC to the SDU part of 488 bytes and transmits the PDU to the BS. In addition, the MS newly adds a header, a FSH, and a CRC to the remaining part of 1012 bytes, to thereby form a PDU of 1024 bytes.

At this stage, although the BS recognizes that 1010 bytes remain to be allocated, the amount of data existing in the MS is 1024 bytes. Thus, the MS reports this difference to the BS. In this example, after 1510 bytes worth of wireless resources are allocated by the BS, the MS sends an additional request for 38 bytes worth of wireless resources. Alternatively, an additional request may be made by using, for example, a piggyback request when a necessity for additional wireless resources arises.

Thus, in order to request wireless resources for the newly generated additional overhead, it becomes necessary to transmit a BR header or a piggyback request to the BS. This leads to a problem of wasting of wireless resources.

On the other hand, in a case where the MS combines plural SDUs into a single PDU and transmits the PDU (packing), the overhead can be reduced. In this case, since the BS is unable to recognize the amount of the reduction, the BS excessively allocates wireless resources to the MS. This also leads to the problem of wasting of wireless resources.

SUMMARY OF THE INVENTION

The present invention may provide a wireless bandwidth allocating method and a wireless base station that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a wireless bandwidth allocating method and a wireless base station particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a wireless base station for allocating a wireless bandwidth to a wireless terminal based on a bandwidth request from the wireless terminal, including: a receiving part configured to receive a target data transmitted in the allocated wireless bandwidth from the wireless terminal, the target data including one or more user packets on which a combining process or a dividing process is performed and data regarding the combining process or the dividing process; and an updating part configured to increase or reduce the total quantity of the bandwidth request.

Furthermore, another embodiment of the present invention provides a wireless base station for allocating a wireless bandwidth to a wireless terminal based on a bandwidth request from the wireless terminal, including: a receiving part configured to receive target data transmitted in the allocated wireless bandwidth from the wireless terminal, the wireless terminal being capable of including a response message in the target data; and an updating part configured to increase the total quantity of the bandwidth request to be allocated to the wireless terminal in a case where the response message is included in the target data received by the receiving part.

Furthermore, another embodiment of the present invention provides a wireless bandwidth allocating method used in a wireless communications system where user packets are encapsulated and communicated between a wireless base station and a wireless terminal, the method including the steps of: a) transmitting a target data from the wireless terminal by using a wireless bandwidth allocated by the wireless base station; b) receiving the target data; and c) increasing or reducing the bandwidth request to be allocated to the wireless terminal depending on whether the target data include data regarding a combining process, data regarding a dividing process, or a response message.

Furthermore, another embodiment of the present invention provides a wireless bandwidth allocating method used in a wireless communications system where user packets are encapsulated and communicated between a wireless base station and a wireless terminal, the method including the steps of: a) requesting allocation of a wireless bandwidth for transmitting one or more of the user packets; b) updating a bandwidth request quantity according to the request of step a); c) allocating the wireless bandwidth to the wireless terminal based on the bandwidth request quantity updated in step b); d) performing a dividing process or a combining process on the user packets; d) transmitting the user packets to the wireless base station according to the allocated wireless bandwidth; and e) updating the bandwidth request to be allocated to the wireless terminal according to the dividing process or the combining process performed on the user packets.

Furthermore, another embodiment of the present invention provides a wireless base station used in a wireless communications system where user packets are encapsulated and communicated between the wireless base station and a wireless terminal, the wireless base station including: a bandwidth request receiving part configured to receive a bandwidth request requesting allocation of a wireless bandwidth for transmitting one or more of the user packets; a bandwidth request quantity updating part configured to update a bandwidth request quantity based on the received bandwidth request; an allocating part configured to allocate the wireless bandwidth to the wireless terminal based on the updated bandwidth request quantity; a detecting part configured to detect a subheader included in the user packets; and a determining part configured to determine whether a dividing process or a combining process is performed on the user packets according to the subheader; wherein the bandwidth request quantity updating part is configured to update the bandwidth request quantity by increasing or reducing the bandwidth request quantity according to a determination result by the determining part.

Other objects and further features of the present invention will be apparent from the following detailed description when read in conjunction with the accompanying drawings.

BRIEF DESCRIPTION OF THE DRAWINGS

FIG. 3 is a schematic diagram showing a format of a UL-MAP message;

FIG. 4 is a schematic diagram showing an example of a UL-MAP message generated in response to, for example, a BR header;

DESCRIPTION OF THE PREFERRED EMBODIMENTS

In the following, embodiments of the present invention will be described with reference to the accompanying drawings.
[Wireless Communication System]

Figure 1:
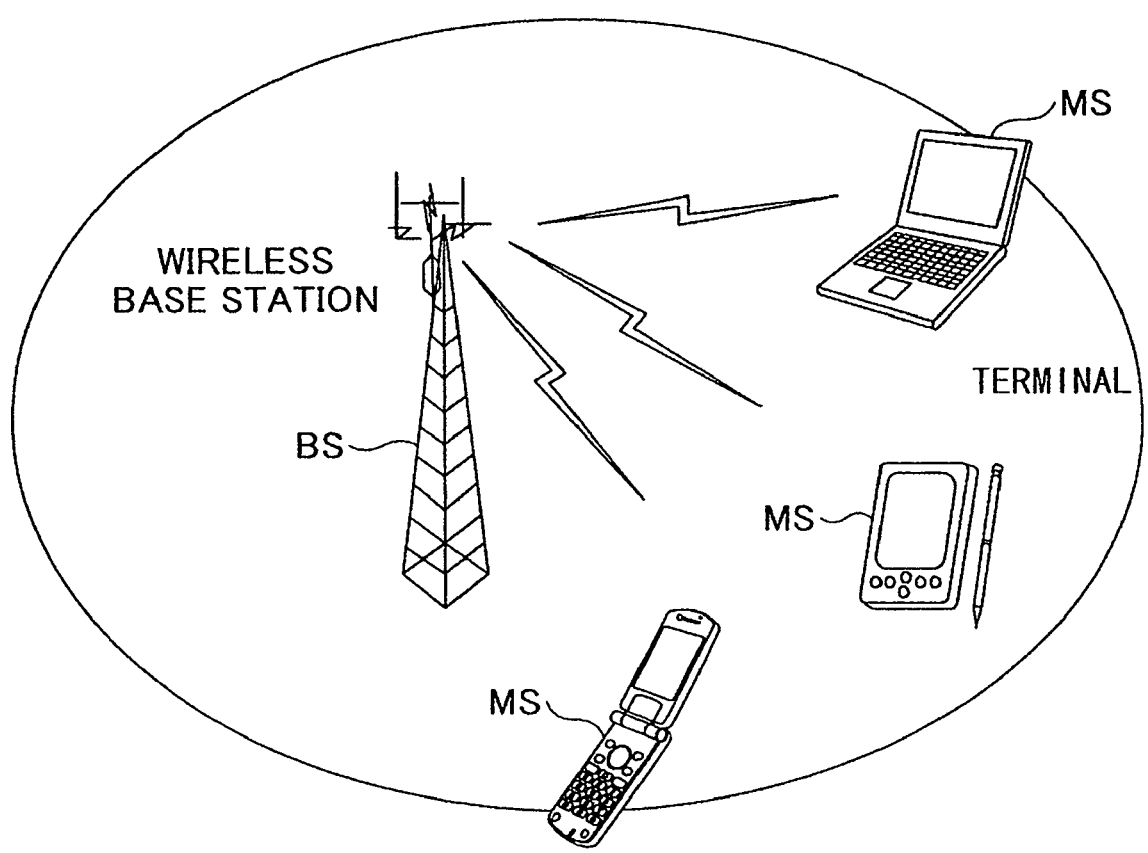
FIG. 1 is a schematic diagram showing a service image of the IEEE 802.16d/e.
Figure 2:
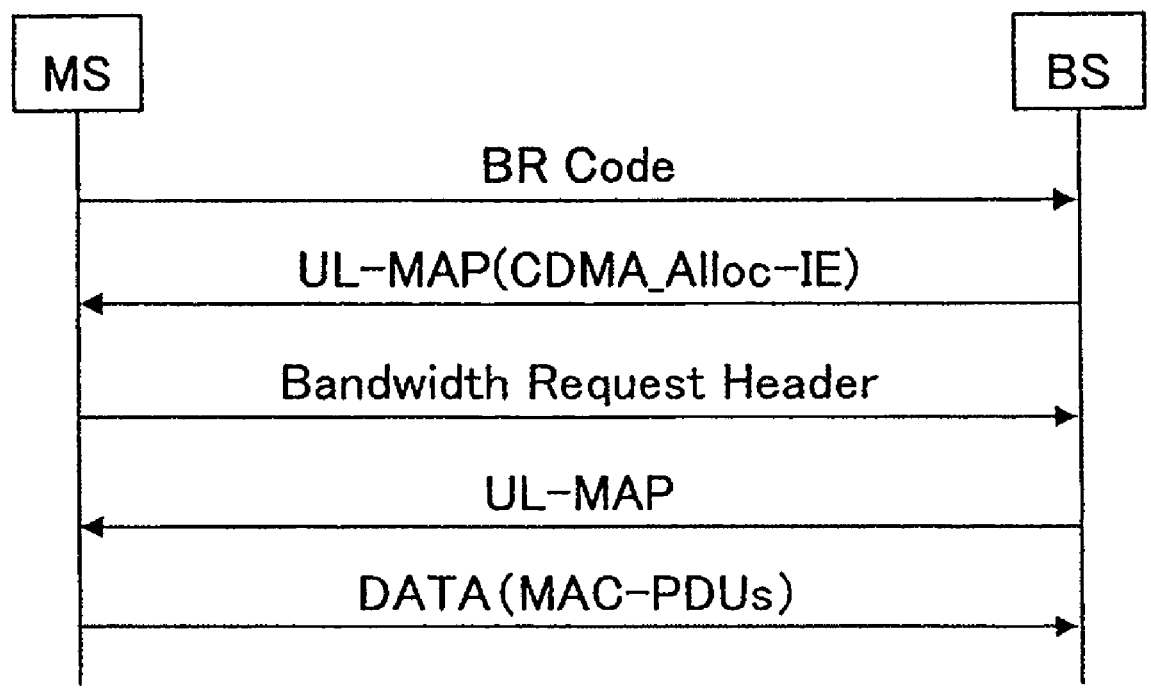
FIG. 2 is a schematic diagram showing a sequence performed until a bandwidth used for transmitting data is actually allocated.
Figures 5A, 5B:
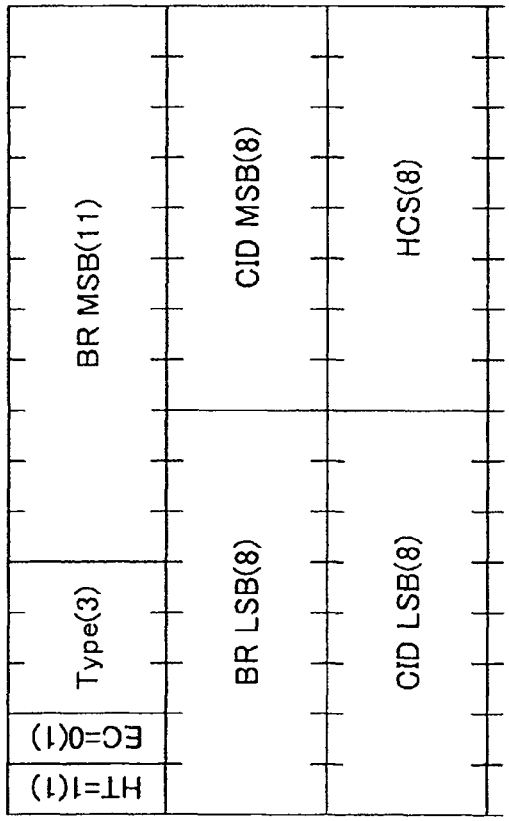
FIGS. 5A and 5B are schematic diagrams for describing a BR header.
Figure 6:
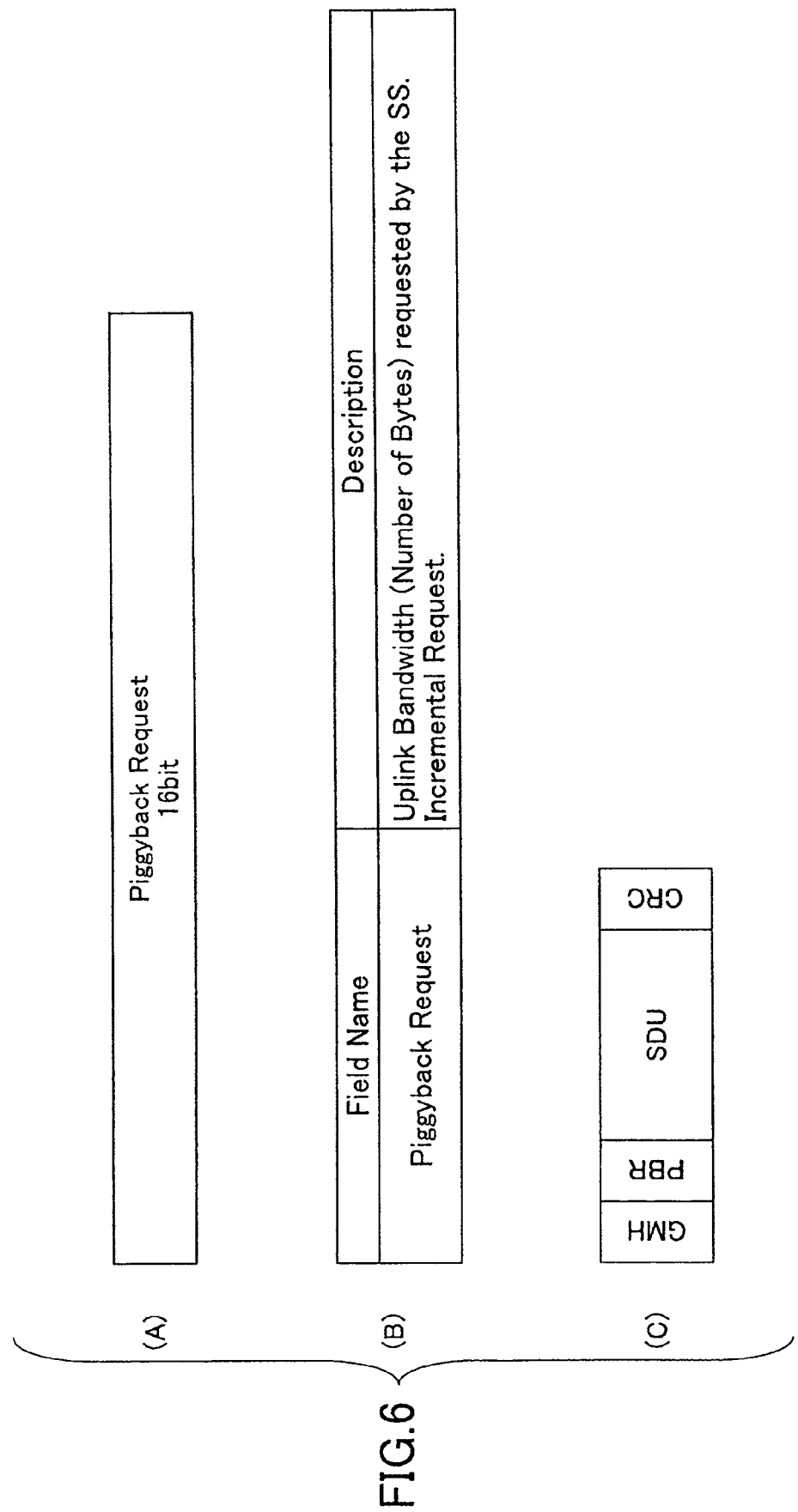
FIG. 6 is a schematic diagram for describing a Grant Management Subheader and MAC-PDU.
Figure 7:
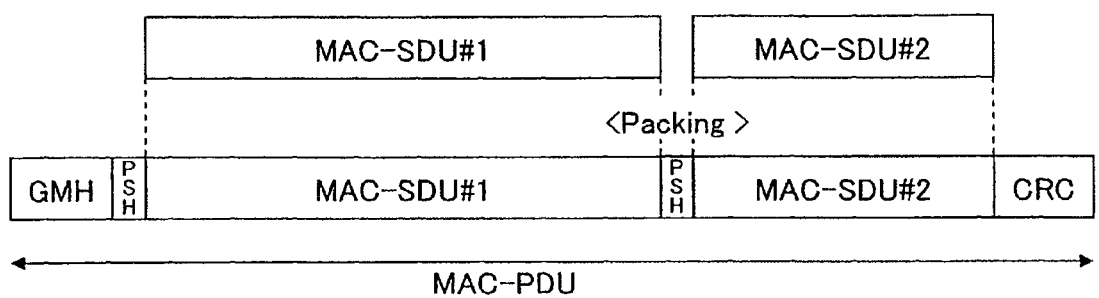
FIG. 7 is a schematic diagram for describing a packing process.
Figure 8:
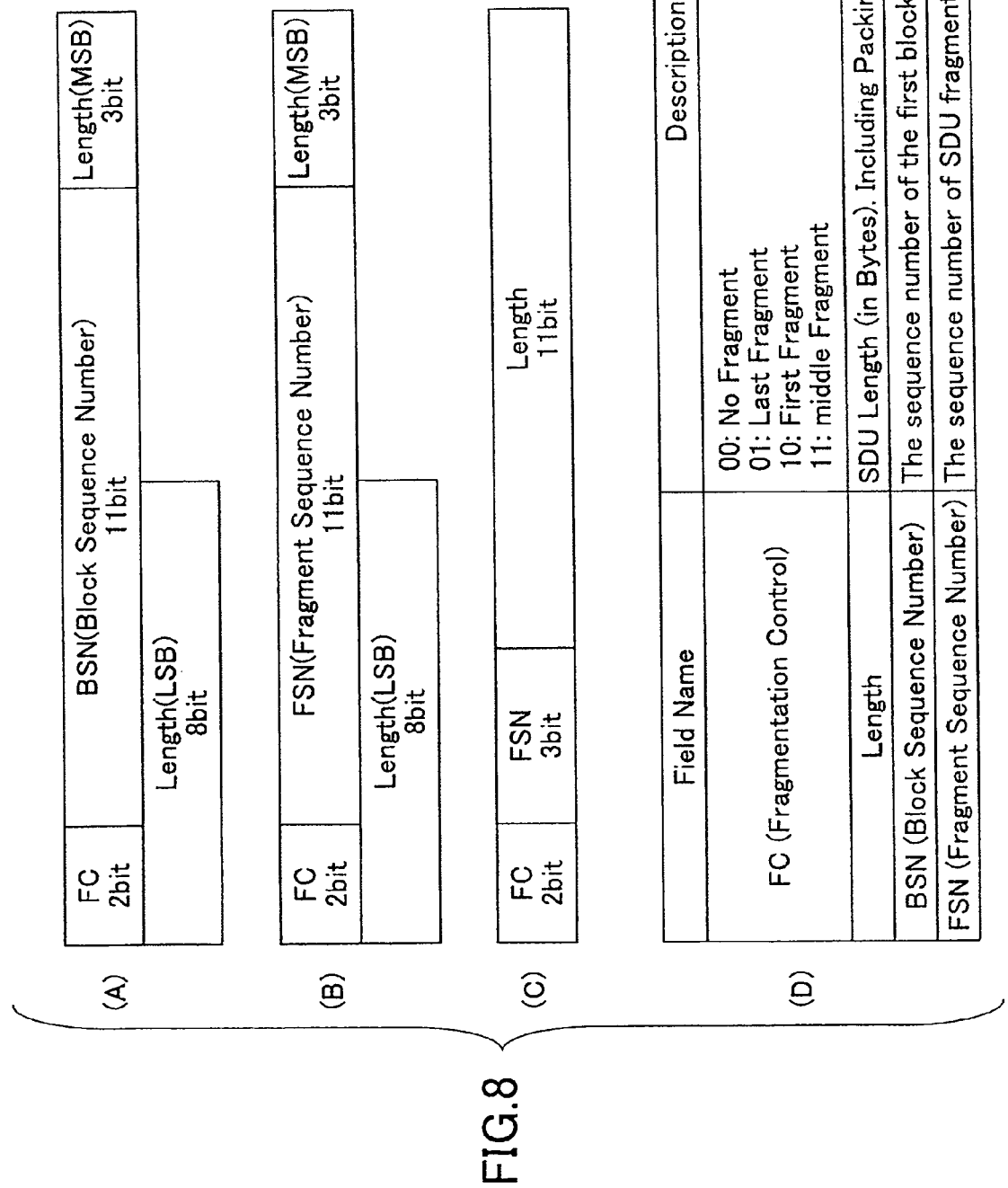
FIG. 8 is a schematic diagram for describing a PSH.
Figure 9:
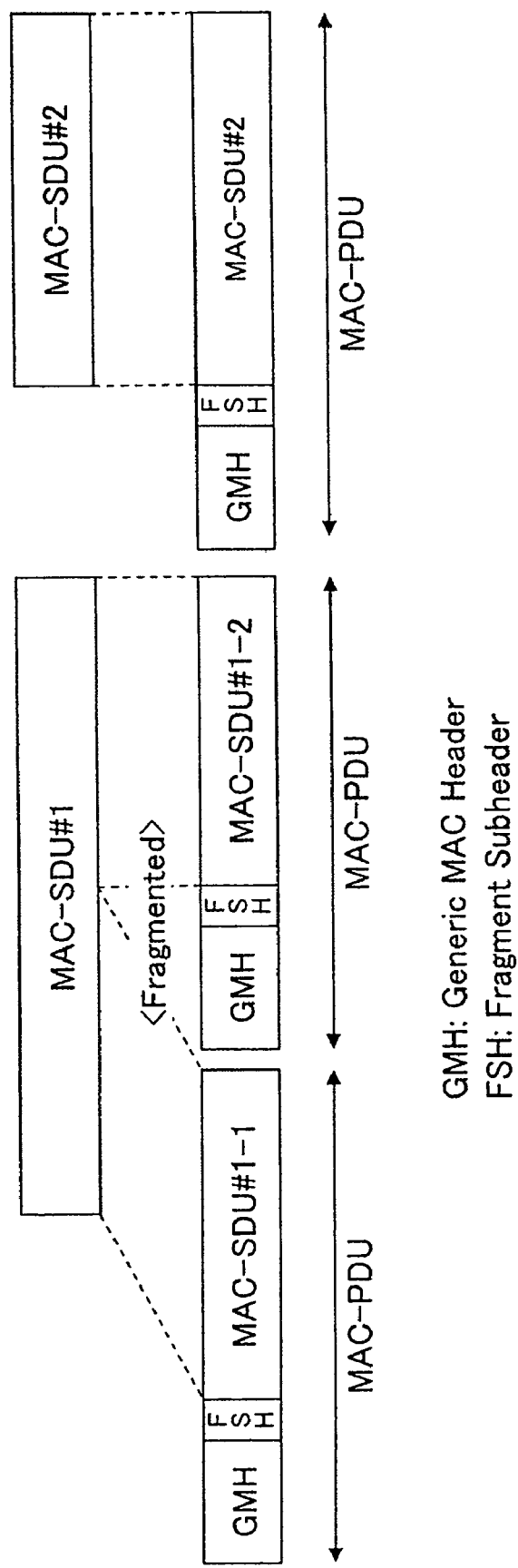
FIG. 9 is a schematic diagram for describing a fragmentation process.
Figure 10:
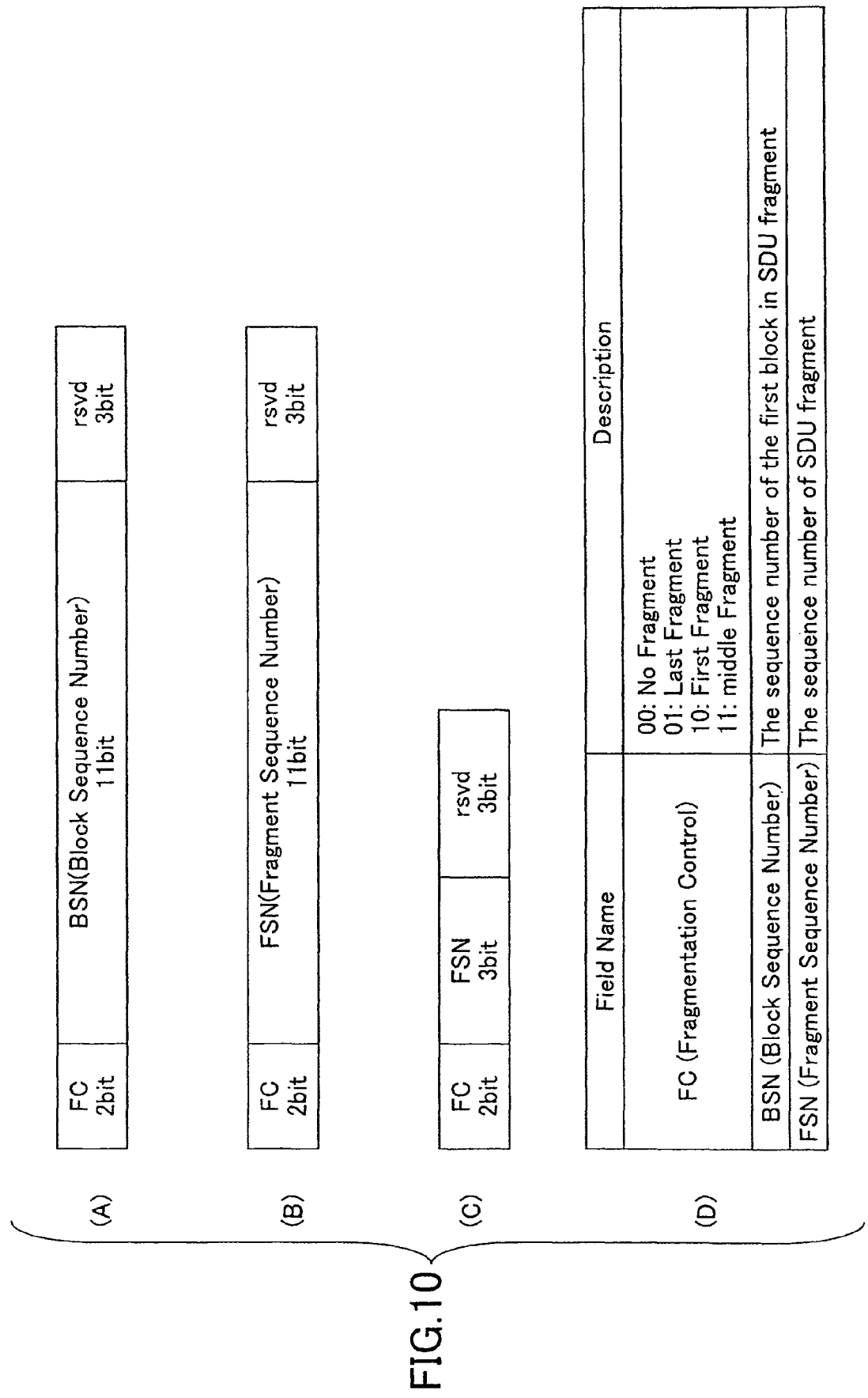
FIG. 10 is a schematic diagram for describing an FSH.
Figure 11:
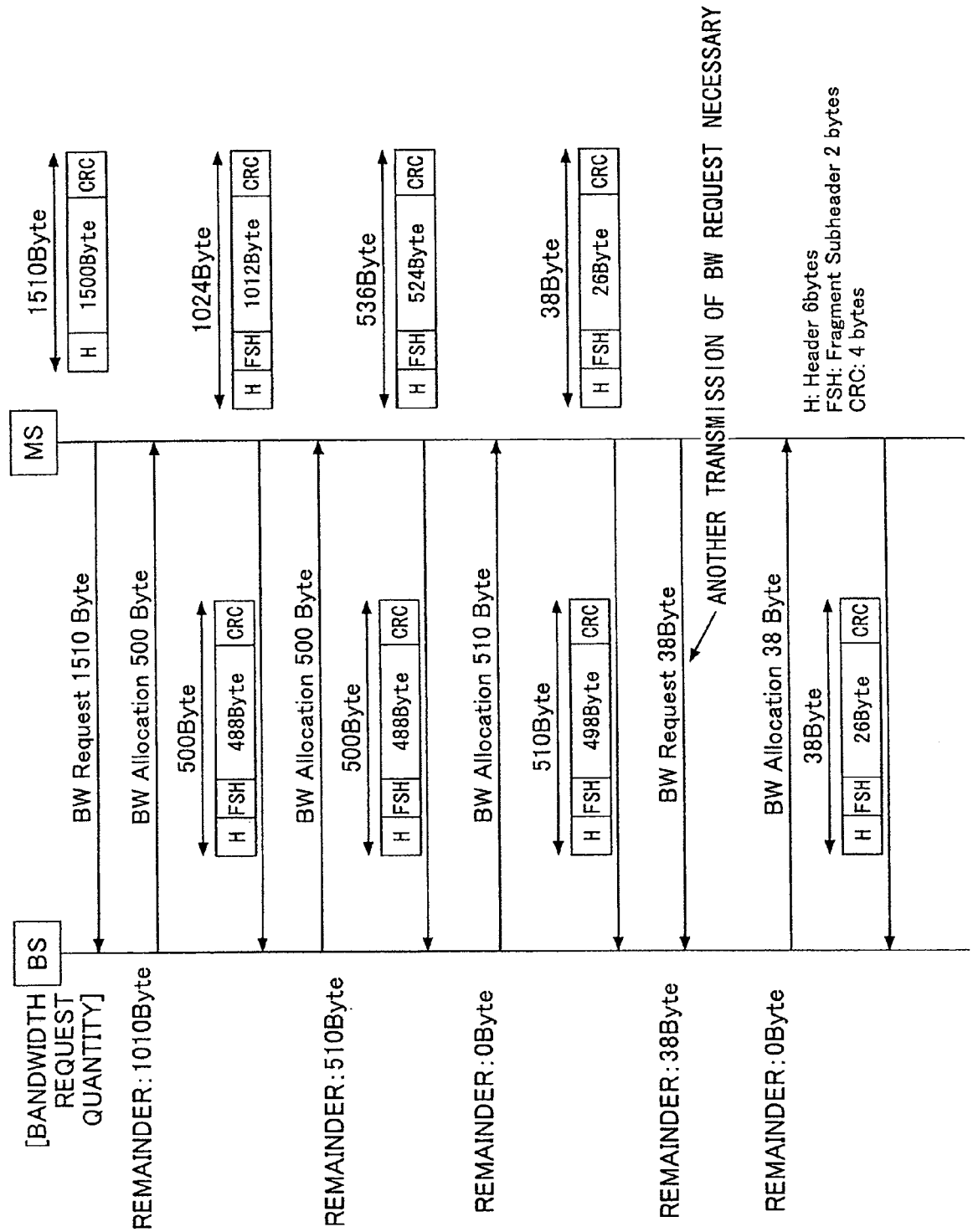
FIG. 11 shows an exemplary process in which overhead is generated by performing of a fragmentation process.
Figure 12:
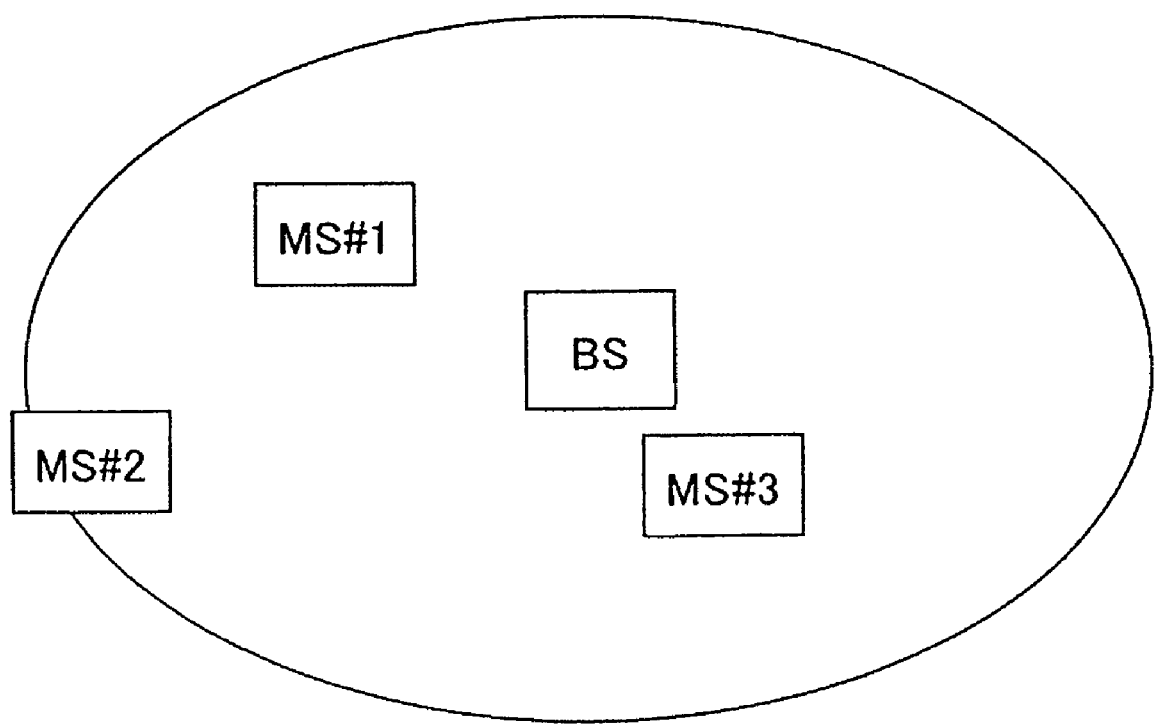
FIG. 12 is a schematic diagram showing a configuration of a wireless communication system including a wireless base station and a wireless terminal according to an embodiment of the present invention.
Figure 13:
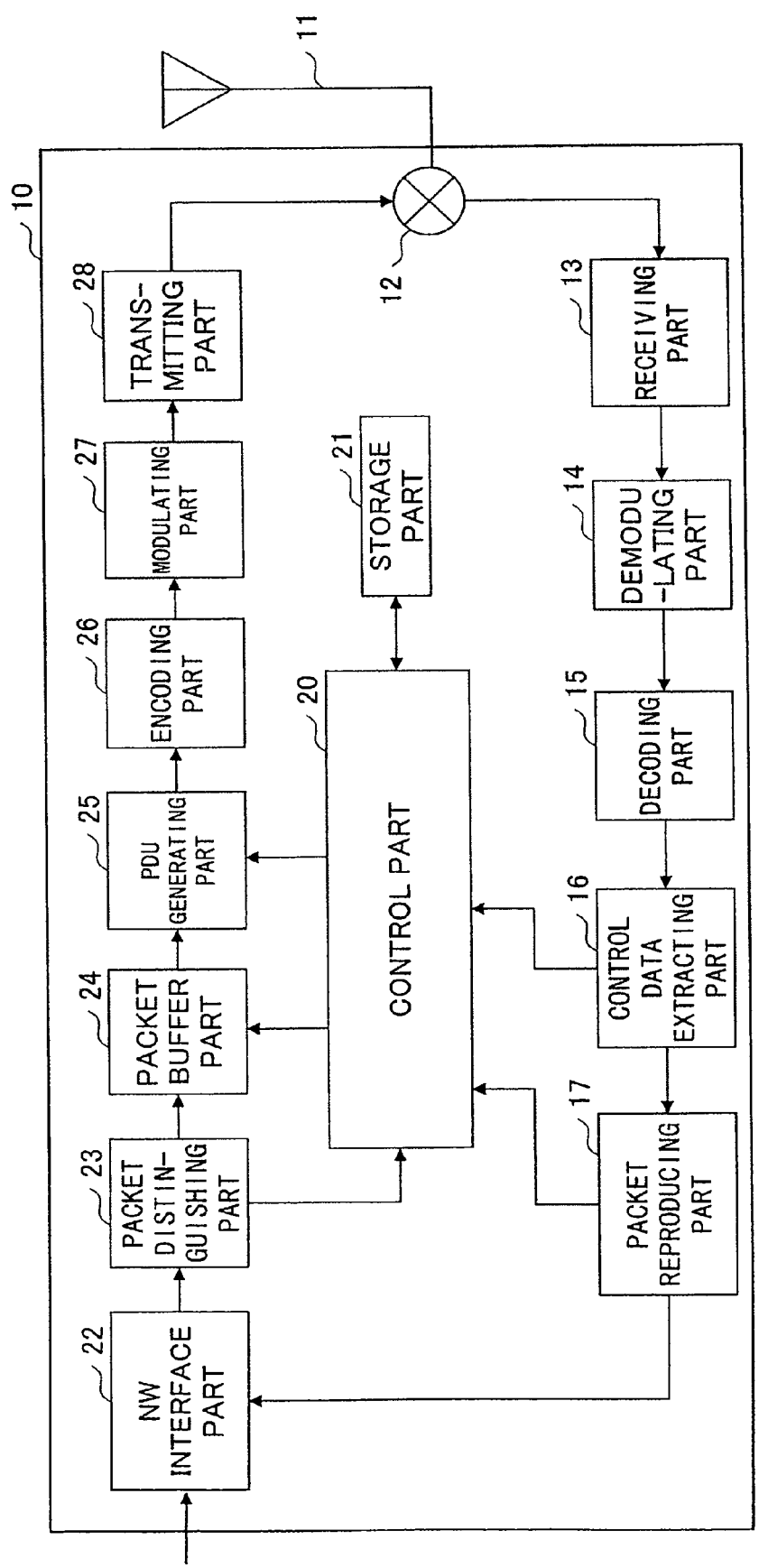
FIG. 13 is a block diagram showing a wireless base station according to an embodiment of the present invention.

FIG. 13 is a block diagram showing a wireless base station 10 according to an embodiment of the present invention. In FIG. 13, the wireless base station 10 includes an antenna 11 for communicating (transmitting/receiving) wireless signals with respect to wireless terminals and a duplexer 12 that is shared by a transmitter section (not shown) and a receiver section (not shown) of the base station. The receiver section includes, for example, a receiving part 13 for receiving signals, a demodulating part 14 for demodulating signals (reception signals) received at the receiving part 13, a decoding part 15 for decoding the reception signals demodulated at the demodulating part 14, a control data extracting part 16 for extracting control data (e.g., BR header) from decoded data and providing the extracted data to a control part 20 in addition to transferring other data (e.g., user data) to a packet reproducing part 17, and the packet reproducing part 17 for forming the data transferred from the control data extracting part 16 into packets and providing the packets to a NW interface part 22 in addition to extracting a packing subheader (PSH) or a fragmentation subheader (FSH) and providing the extracted subheaders to the control part 20.

The NW interface part 22 is an interface with respect to a routing apparatus (not shown) for performing packet communications. The routing apparatus is connected to plural wireless base stations and controls the routes of data (e.g., packet data).

A packet distinguishing part 23 is for distinguishing IP addresses included in packet data received at the NW interface part 22 and designating a destination MS based on IP address data. For example, the packet distinguishing part 23, which has stored a corresponding relationship between IP address data and MSs, obtains an ID of a corresponding MS. The packet distinguishing part 23, which also has stored a corresponding relationship between QoS data and IDs, obtains QoS data. Then, the packet distinguishing part 23 sends a bandwidth allocation request together with an ID, QoS data, and data size to the control part 20. The packet distinguishing part 23 also sends packet data received from the NW interface part 22 to a packet buffer part 24. The packet buffer part 24 stores the packet data received from the packet distinguishing part 23.

In terms of traffic in a downlink direction (from BS to MS), the control part 20, upon receiving the bandwidth allocation request, selects a MS to which a bandwidth is to be allocated and instructs the packet buffer part 24 and a PDU generating part 25 to schedule transmission of user data. The control part 20 also generates control data and instructs the PDU generating part 25 to have the control data transmitted in the same manner as the user data.

In terms of traffic in an uplink direction (from MS to BS), the control part 20, manages the amount of bandwidth requests based on data of the BR header provided by the control data extracting part 16, generates allocation data (MAP message) indicating an uplink bandwidth to be allocated to a MS, and instructs the PDU generating part 25 to have the allocation transmitted to the MS.

The control part 20 also performs various processes on the received control data. For example, the control part 20 performs registration of functions supported by a MS, authentication of a MS, key generation/key exchange, and management of the status of wireless channels. Furthermore, the control part 20 is connected to a storage part 21. The storage part 21 stores various data that are to be stored in the BS. For example, the storage part 21 stores function data of a MS included in control data received from the MS, authentication data, key data, wireless channel data, and QoS data of a connection. The storage part 21 is also used for storing and managing status of usage of resources of the BS. A bandwidth request quantity management table (described below) is stored in the storage part 21.

The PDU generating part 25 is for generating PDUs in a manner such that transmission data (e.g., user data, control data) are contained in a wireless frame generated in accordance with a synchronization signal (preamble). The PDU generating part 25 sends the generated PDU to an encoding part 26. The encoding part 26 performs an encoding process (e.g., encoding of error correction data) on the PDU data and sends the encoded PDU data to a modulating part 27. Then, the modulating part 27 performs modulation on the PDU data and sends the modulated PDU data to a transmitting part 28. Then, the transmitting part 28 transmits the PDU data as wireless signals via the antenna 11.

<Configuration of Wireless Terminal>

Figure 14:
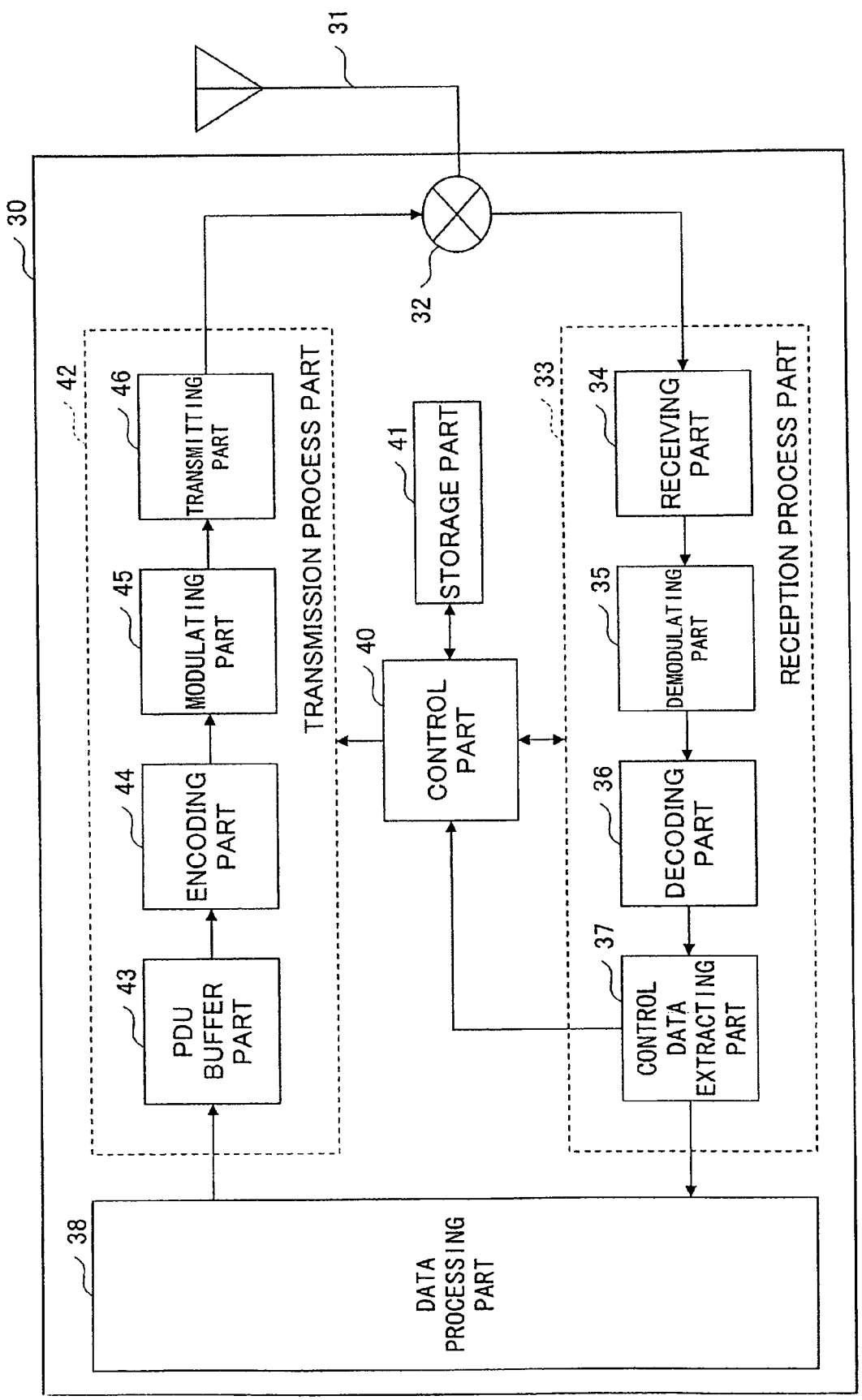
FIG. 14 is a block diagram showing a wireless terminal according to an embodiment of the present invention.

FIG. 14 is a block diagram showing a wireless terminal 30 according to an embodiment of the present invention. In FIG. 14, the wireless terminal includes an antenna 31 for communicating (transmitting/receiving) wireless signals between a wireless base station and a duplexer 32 that is shared by a transmitter section 42 and a receiver section 33. The receiver section 33 includes, for example, a receiving part 34 for receiving signals, a demodulating part 35 for demodulating signals (reception signals) received at the receiving part 34, a decoding part 36 for decoding the reception signals demodulated at the demodulating part 35, and a control data extracting part 37 for extracting control data from decoded data and providing the extracted data to a control part 40 in addition to transferring other data (e.g., user data) to a data processing part 38.

The data processing part 38 is for performing various processes on data included in the received data such as displaying of data or outputting audio data. Furthermore, the data processing part 38 provides user data desired to be transmitted to a communication partner (transmission data) to a PDU buffer part 43 of the transmitter section 42.

The PDU buffer part 43 is for storing transmission data received from the data processing part 38, reading out the stored transmission data according to a designation from the control part 40, and outputting the designated transmission data to an encoding part 44.

In accordance with controls of the control part 40, the encoding part encodes the transmission data, a modulating part 45 modulates the encoded transmission data, and a transmitting part 46 transmits the modulated transmission data as wireless signals via the antenna 31.

The control part 40 is for performing various processes on the control data received from or to be transmitted to the BS. For example, the control part 40 performs registration of functions supported by the MS, authentication, key generation/key exchange, and management of the status of wireless channels. Furthermore, the control part 40 controls the transmission process part 42 based on allocation data received from the BS indicating an uplink bandwidth to be allocated to the MS, so that user data or control data can be transmitted to the BS. In a case where allocation of a bandwidth is necessary, the control part 40 instructs the transmission process part 42 to transmit a BR header of a connection requiring allocation of a bandwidth to the BS.

<First Embodiment>

As described above, a wireless base station performs a process of allocating a wireless bandwidth to a wireless terminal based on a bandwidth request from the wireless terminal. According to the first embodiment of the present invention, in a case where the wireless terminal transmits data obtained by performing a dividing process (fragmentation) or a combining process (packing) on one or more user packets, the wireless base station is configured to increase or reduce the total quantity of bandwidth request to be allocated to the wireless terminal based on data received from the wireless terminal including data regarding packing or fragmentation of the user packets. Accordingly, even in a case where fragmentation or packing is performed on user packets by the wireless terminal, the total quantity of bandwidth request to be allocated to the wireless terminal can be adaptively updated.

<Process During Generation of Transmission Data by MS>

Figure 15:
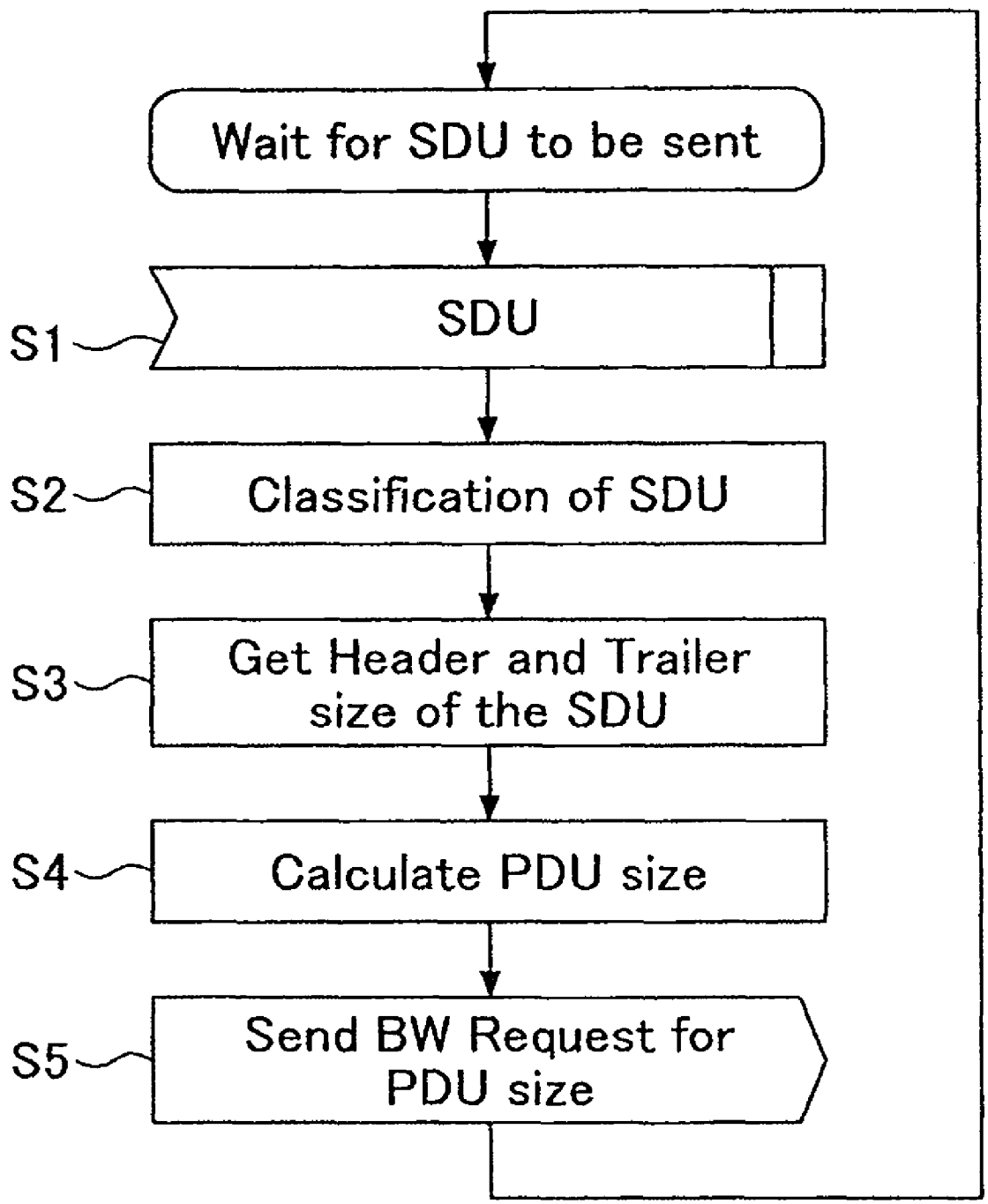
FIG. 15 is a flowchart showing an operation performed when transmission data (SDU) including user packets are generated by a MS according to an embodiment of the present invention.

FIG. 15 is a flowchart showing an operation performed when transmission data (SDU) including, for example, user packets containing user data are generated by a MS. In a MS, when an upper layer protocol generates an SDU (e.g., IP packet) (Step S1), a connection is classified (distinguished) based on header data of the SDU (Step S2).

Then, a header corresponding to the connection is generated and supplied with a necessary trailer (e.g., CRC), to thereby form a PDU (data and wireless packets obtained by performing, for example, encapsulation on an SDU) (Step S3). In a case where the connection is subject to encryption, the PDU is supplied with necessary data (e.g., packet number, authentication code) and encrypted. In the below described embodiments of the present invention, the packet number and the authentication code may be included in the header or the trailer.

Then, the length of the PDU is calculated (Step S4). Then, the MS requests bandwidth allocation by transmitting bandwidth allocation data (e.g., BR header) including the calculated length of the PDU to the BS (Step S5). More specifically, in this example, allocation of bandwidth is requested by calculating the length of a PDU(s) supposing that no fragmentation (no simultaneous generation of SDU) or no packing (no combining of SDUs into a single PDU) is performed and transmitting the total of the calculated length to the BS.

A bandwidth can be requested not only in a case where an SDU is generated but also in a case where a subheader for a control signal (ARQ Feedback header/Subheader) is generated by using a BR header or a piggyback BW Request.

<Process During Transmission of Data (SDU) by MS>

Figure 16:
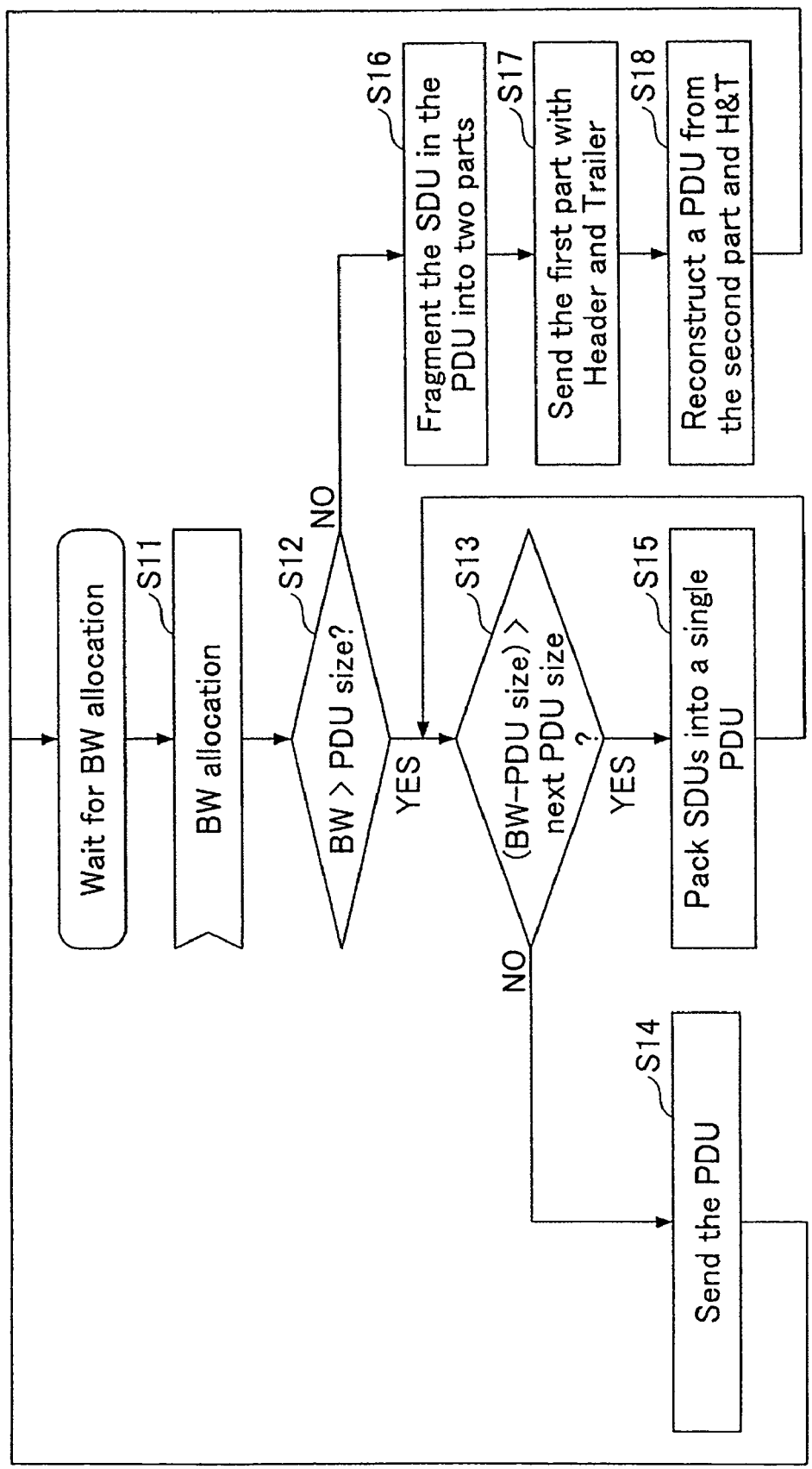
FIG. 16 is a flowchart showing an operation performed when data (SDU) are transmitted by a MS according to an embodiment of the present invention.

FIG. 16 is a flowchart showing an operation performed when data (SDU) are transmitted by a MS.

When a wireless bandwidth is allocated by the BS (Step S11), the MS determines whether the quantity of the allocated bandwidth is sufficient for transmitting a single PDU (Step S12).

In a case where the allocated bandwidth is sufficient, it is determined whether the SDU included in the next PDU can be transmitted in view of an increase of a subheader and reduction of a header and a trailer when packing is performed (Step S13).

In a case where transmission of the next PDU by packing the SDU included in the next PDU cannot be achieved, the first PDU is transmitted (Step S14). In this case, it is possible to transmit a BR header or a piggyback BW request for requesting a wireless bandwidth for transmitting the next PDU. Furthermore, packing may be performed after fragmentation is performed.

On the other hand, in a case where transmission of the next PDU can be achieved, the SDU included in the next PDU is extracted and packed with a payload of the first PDU, to thereby generate a new PDU (Step S15). In this case, a packing subheader (PSH) is added to each SDU in the new PDU. This operation is repeated until all of the wireless bandwidth for transmitting the new PDU are used (exhausted), to thereby transmit the new PDU having plural SDUs packed therein.

Furthermore, in a case where the first PDU cannot be transmitted within the allocated bandwidth, the SDU inside the PDU is divided (fragment) for enabling a PDU to be transmitted within the allocated wireless bandwidth (Step S16). Then, a first fragment PDU is formed by adding a header, a trailer, and a fragment subheader (FSH) to a first part of the divided SDU (first SDU part) and is transmitted (Step S17). Then, in the same manner, a second fragment PDU is formed by adding a header, a trailer, and a fragment subheader (FSH) to a remaining part of the divided SDU (last SDU part) and waits for a wireless bandwidth to be allocated (Step S18).

The FC bits of the FSH added to the first SDU part include '10' (first fragment). The FC bits of the FSH added to the last SDU part include '01' (last fragment). Furthermore, in a case where the last SDU part is further divided into two parts, the front part is a middle SDU part (FC bits='11' (middle fragment)) and the latter part becomes a last SDU part).

<Process of Updating Bandwidth Request Quantity by BS when Receiving Bandwidth Request>

Figures 17, 18:
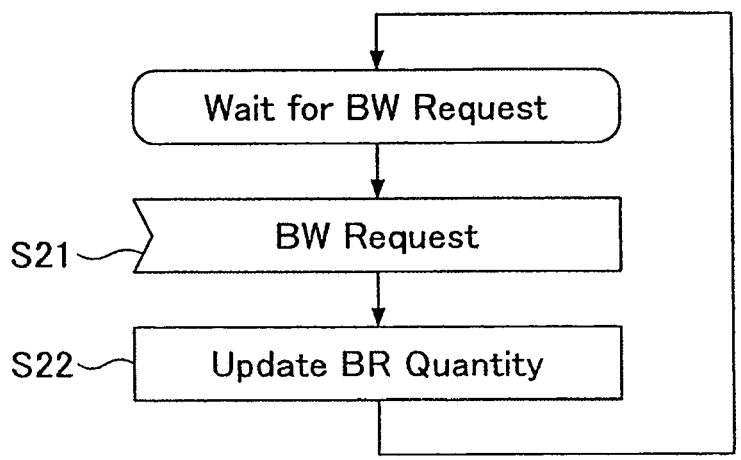
FIG. 17 is a flowchart showing an operation of updating a bandwidth request quantity performed by a BS when the BS receives a bandwidth request according to an embodiment of the present invention.
FIG. 18 is an example of a bandwidth request quantity management table according to an embodiment of the present invention.

FIG. 17 is a flowchart showing an operation of updating a bandwidth request quantity performed by a BS when the BS receives a bandwidth request.

In FIG. 17, a BW request corresponds to, for example, a BR header or a piggyback BW request (PBR).

When a BS receives a BR header or a PBR (Step S21), the BS updates a bandwidth request quantity. More specifically, the BS refers to a CID included in a header used for transmitting a BR header or a PBR, searches for a bandwidth request quantity corresponding to the CID in a bandwidth request quantity management table, and updates the corresponding bandwidth request quantity (Step S22). FIG. 18 shows an example of the bandwidth request quantity management table.

In a case where the received BR header is an "Aggregate" type, the corresponding bandwidth request quantity is overwritten with the data inside the BR header. In a case where the received BR header or the PBR is an "Incremental" type, a value included in the BR header or the PBR is added to the corresponding bandwidth request quantity. It is to be noted that all PBRs are the "Incremental" type.

<Process of Updating Bandwidth Request Quantity by BS when Allocating Bandwidth>

Figure 19:
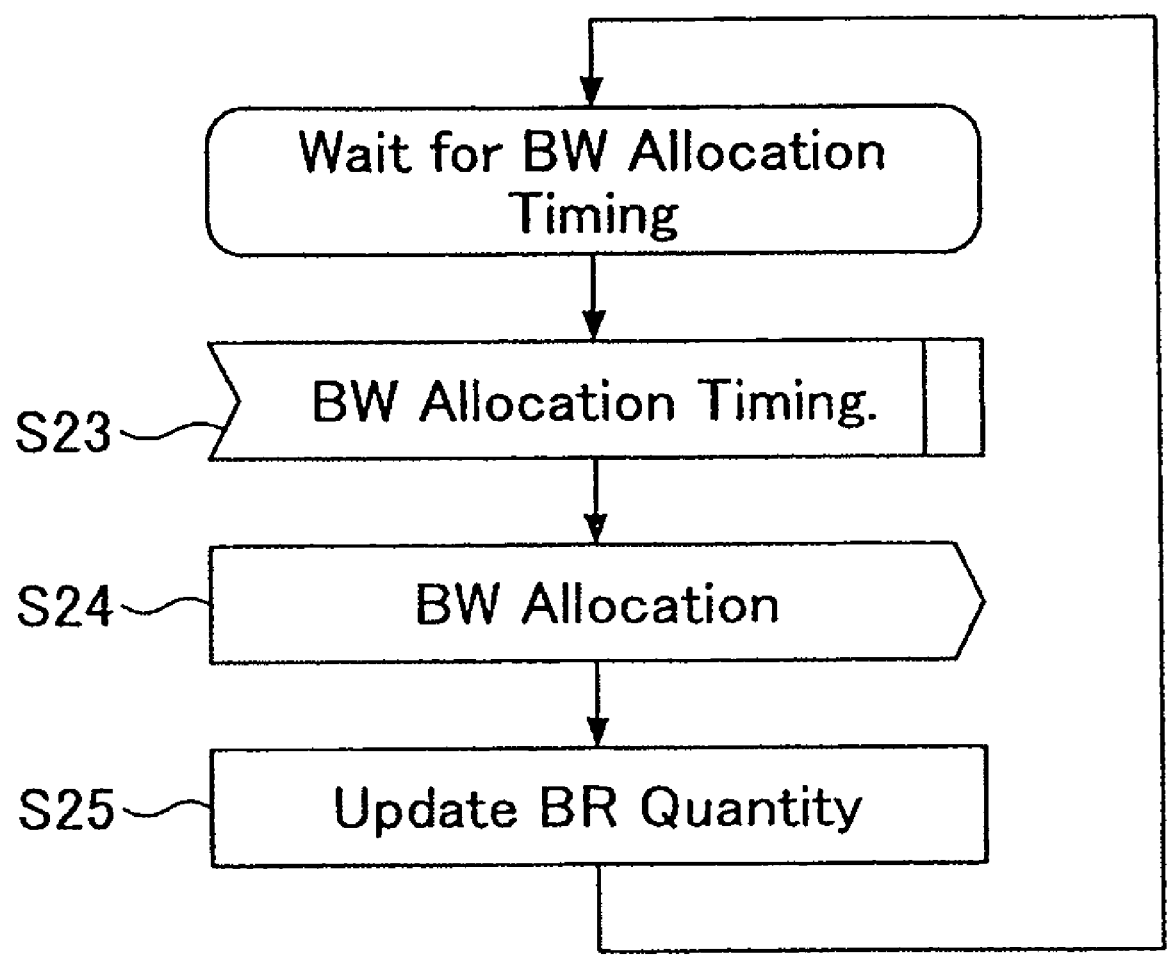
FIG. 19 is a flowchart showing an operation of performed when a bandwidth is allocated by a BS according to an embodiment of the present invention.

FIG. 19 is a flowchart showing an operation of updating a bandwidth request quantity performed by a BS when the BS allocates a bandwidth.

The BS determines to which MS and which CID of the MS should a wireless bandwidth be allocated per a predetermined wireless frame (e.g., 5 ms) (Step S23) and allocates a wireless bandwidth to the determined CID of the determined MS by transmitting MAP data to the determined MS (Step S24). Then, when the wireless bandwidth (wireless resource) is allocated to the CID, the bandwidth request quantity corresponding to the CID is updated (Step S25). That is, an amount corresponding to the allocated quantity is subtracted from the bandwidth request quantity.

<Process of Updating Bandwidth Request Quantity by BS when Receiving PDU>

Figure 20:
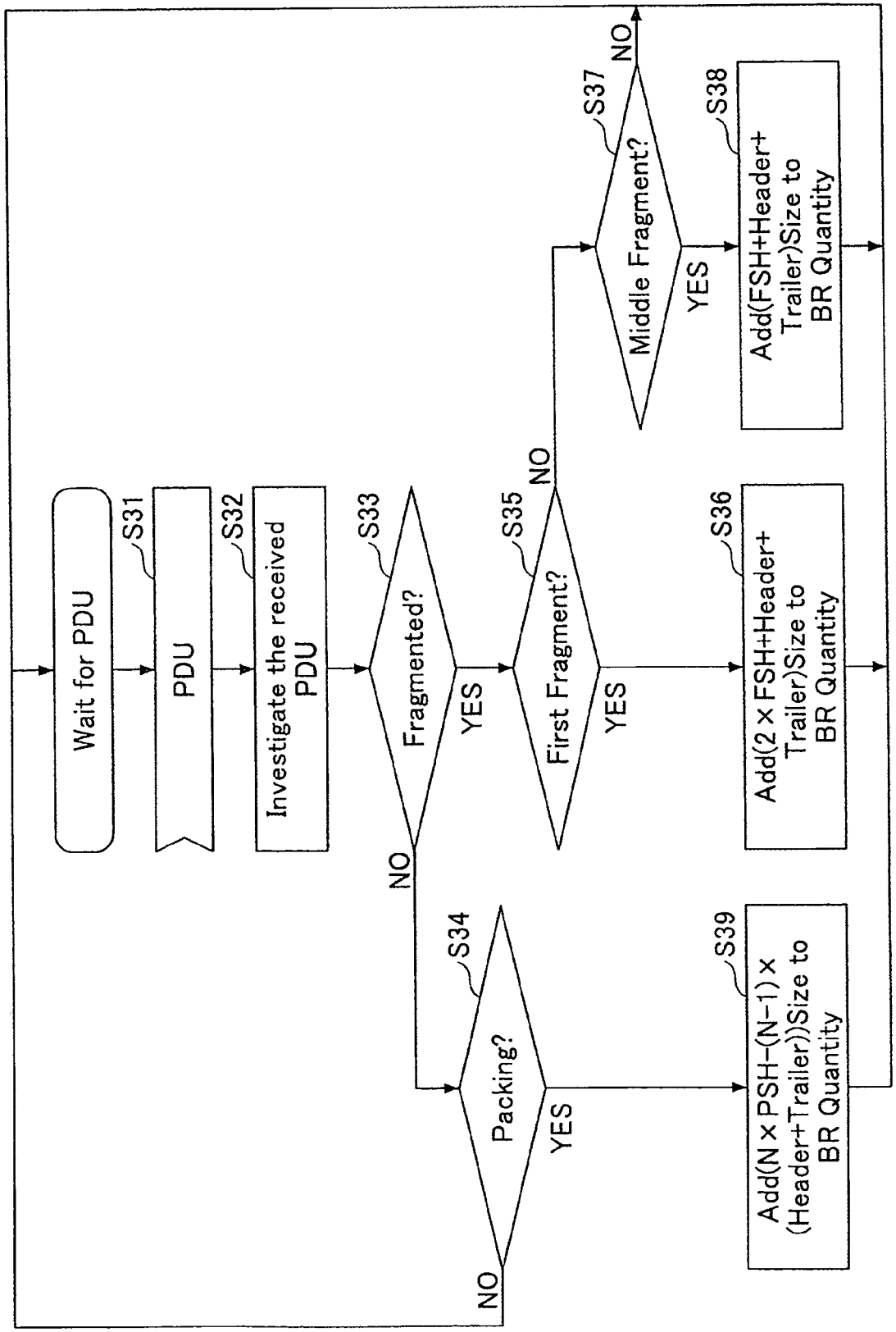
FIG. 20 is a flowchart showing an operation of updating a bandwidth request quantity performed by a BS when the BS receives a PDU according to an embodiment of the present invention.

FIG. 20 is a flowchart showing an operation of updating a bandwidth request quantity performed by a BS when the BS receives a PDU.

When the BS receives a PDU from the MS (Step S31), the BS determines whether a SDU included in the PDU is fragmented (divided) or whether plural SDUs are packed (combined) into the PDU (Step S32-34). In a case where the SDU(s) of the PDU is neither fragmented nor packed, updating of the bandwidth request quantity is not performed, and the operation returns to Step S31 (Step S34).

More specifically, the BS calculates the bandwidth quantity that is to be increased or reduced based on data included in the received PDU (data indicating the configuration of the SDU (header data indicating data regarding fragmentation or packing)) and updates the bandwidth request quantity (wireless bandwidth to be allocated) based on the calculated bandwidth quantity.

In a case where fragmented SDU parts are included in the received PDU, the method of updating the bandwidth request quantity differs depending on the FC bit value of the FSH.

(1) In a Case Where FC Bits='10' First Fragment

In this case, an amount equivalent to i) a FSH added to the first SDU part, ii) a header added to the last SDU part, iii) a trailer added to the last SDU part, and iv) another FSH added to the last SDU part is the newly generated (occurring) data quantity. Therefore, a quantity of "2×FSH+header+trailer" is added to the bandwidth request quantity (Steps S35 and S36).

(2) In a Case Where FC Bits='11' Middle Fragment

In this case, an amount equivalent to i) a header added to the last SDU part, ii) a trailer added to the last SDU part, and iii) a FSH added to the last SDU part is the newly generated (occurring) data quantity. Therefore, a quantity of "FSH+header+trailer" is added to the bandwidth request quantity (Steps S37 and S38).

(3) In a Case Where FC Bits='01' Last Fragment

In this case, no new data are generated. Therefore, updating of the bandwidth request quantity is not performed, and the operation returns to Step S31 (Step S37).

In a case where plural SDUs are packed into the received PDU, an amount equivalent to the PSHs (packing subheader) added to each of the SDUs is the newly generated (occurring) data quantity. In addition, an amount equivalent to the headers and trailers initially added to the packed SDU is a data quantity that is to be reduced (Step S39). That is, in a case where the number of SDUs included in the PDU is N, an amount equivalent to "N×PSH−(N−1)×(header+trailer)" is added to the bandwidth request quantity. Normally, a relationship of "N×PSH<(N−1)×(header+trailer)" is satisfied. Therefore, the bandwidth request quantity usually decreases.

<Sequence of Bandwidth Allocation Request/Bandwidth Allocation in a Case of Performing a Fragmentation Process According to a First Embodiment of the Present Invention>

Figure 21:
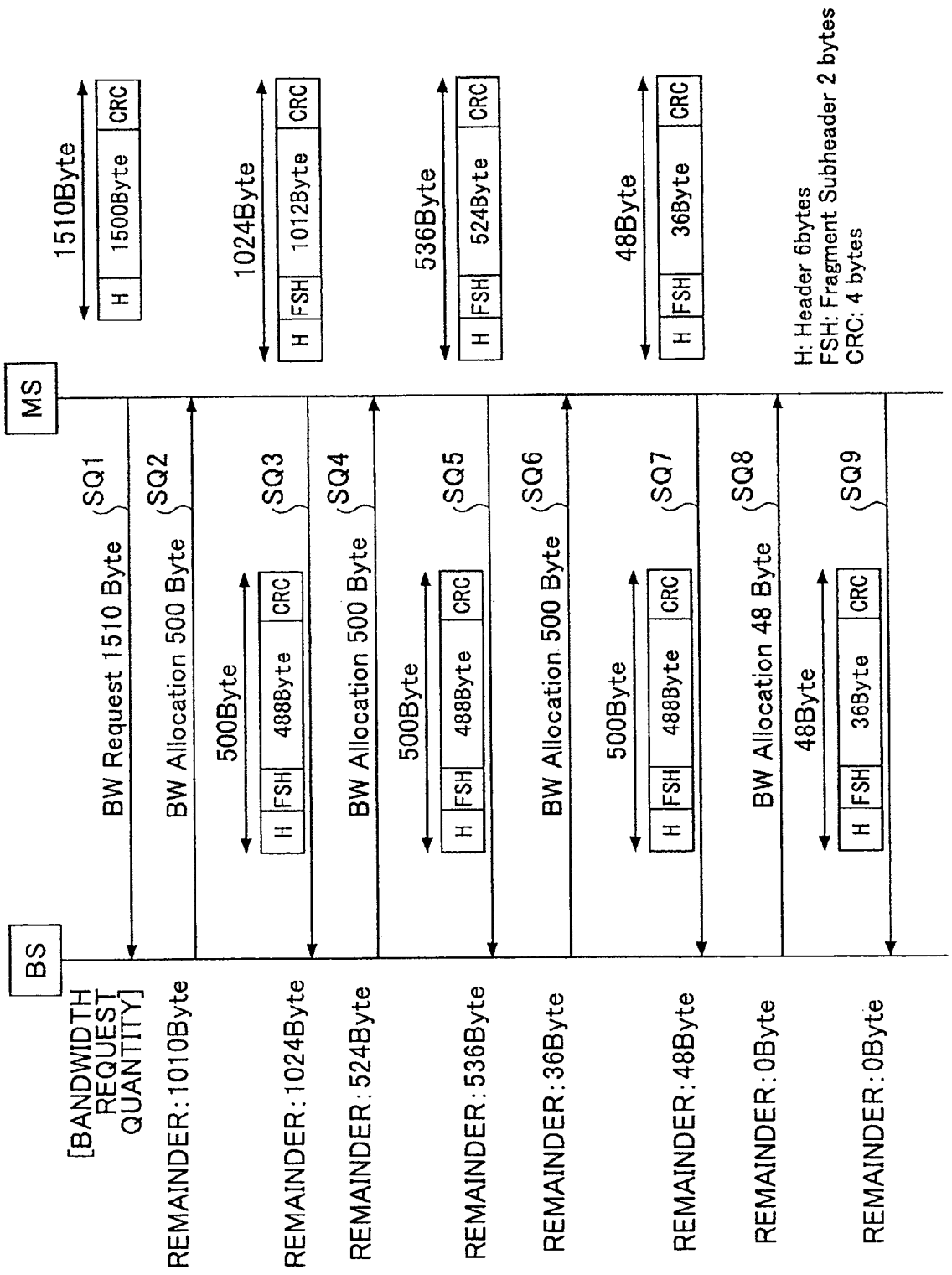
FIG. 21 is a diagram showing a sequence of bandwidth allocation request/bandwidth allocation in a case of performing a fragmentation process according to a first embodiment of the present invention.

FIG. 21 is a diagram showing a sequence of bandwidth allocation request/bandwidth allocation in a case of performing a fragmentation process according to a first embodiment of the present invention. FIG. 21 shows an example where an MS transmits a bandwidth request for transmitting 1510 bytes of data including a header and a trailer (e.g., CRC) to a BS in order to transmit an SDU of 1500 bytes.

First, the MS requests wireless bandwidth allocation for transmitting a PDU of 1510 bytes (SQ1). In this example, the BS, taking available wireless resources into consideration, allocates a wireless bandwidth of 500 bytes (SQ2). At this stage, the remaining bandwidth request quantity is 1010 bytes.

When a bandwidth of 500 bytes is allocated from the BS, the MS divides the SDU of 1500 bytes into a first SDU part of 488 bytes and a last SDU part of 1012 bytes, adds a header (H), a trailer (CRC), and a fragment subheader (FSH) to the first SDU part, reconstructs a PDU of 500 bytes, and transmits the PDU to the BS (SQ3). In the same manner, another PDU is generated by adding a header, a trailer, and a fragment subheader to the last SDU part of 1012 bytes. The FC bits of the FSH added to the first SDU part are '10' first fragment, and the FC bits of the FSH added to the last SDU part are a '01' last fragment.

When the BS receives the PDU of 500 bytes from the MS, the BS detects that the first SDU part is included in the PDU by referring to the FSH (FC bits='10' first fragment). Then, the BS adds i) data quantity of the FSH added to the PDU, ii) data quantity of the header newly added to the SDU remaining in the MS (i.e. header added to the last SDU part), iii) data quantity of the trailer newly added to the SDU remaining in the MS (i.e. trailer added to the last SDU part), and iv) data quantity of the FSH newly added to the SDU remaining in the MS (i.e. FSH added to the last SDU part), which totals 14 bytes, to the bandwidth request quantity corresponding to the CID of the received PDU. Accordingly, the bandwidth request quantity is increased to 1024 bytes.

Then, the BS allocates 500 bytes of bandwidth from the 1024 bytes of bandwidth request quantity to the MS (SQ4). At this stage, the BS recognizes that the bandwidth request quantity remaining is 524 bytes.

When the MS is allocated a bandwidth of 500 bytes, the MS further divides the SDU of 1012 bytes into a middle SDU part of 488 bytes and a last SDU part of 524 bytes. Then, a header, a trailer, and a FSH (FC bits='11' Middle fragment) are added to the middle SDU part, to thereby generate a PDU. In the same manner, a header, a trailer, and a FSH (FC bits='01' Last fragment) are added to the last SDU part, to thereby generate another PDU. Then, the PDU including the middle SDU part is transmitted to the BS (SQ5).

When the BS receives the PDU of 500 bytes from the MS, the BS detects that the middle SDU part is included in the PDU by referring to the FSH (FC bits='11' Middle fragment). Then, the BS adds i) data quantity of the header newly added to the SDU remaining in the MS (i.e. header added to the last SDU part), ii) data quantity of the trailer newly added to the SDU remaining in the MS (i.e. trailer added to the last SDU part), and iii) data quantity of the FSH newly added to the SDU remaining in the MS (i.e. FSH added to the last SDU part), which totals 12 bytes, to the bandwidth request quantity corresponding to the CID of the received PDU. Accordingly, the bandwidth request quantity is increased to 536 bytes.

When the MS is allocated a bandwidth of 500 bytes (SQ6), the MS further divides the SDU of 524 bytes into a middle SDU part of 488 bytes and a last SDU part of 36 bytes. Then, a header, a trailer, and a FSH (FC bits='11' Middle fragment) are added to the middle SDU part, to thereby generate a PDU. In the same manner, a header, a trailer, and a FSH (FC bits='01' Last fragment) are added to the last SDU part, to thereby generate another PDU. Then, the PDU including the middle SDU part is transmitted to the BS (SQ7).

When the BS receives the PDU of 500 bytes from the MS, the BS detects that the middle SDU part is included in the PDU by referring to the FSH (FC bits='11' Middle fragment). Then, the BS adds i) data quantity of the header newly added to the SDU remaining in the MS (i.e. header added to the last SDU part), ii) data quantity of the trailer newly added to the SDU remaining in the MS (i.e. trailer added to the last SDU part), and iii) data quantity of the FSH newly added to the SDU remaining in the MS (i.e. FSH added to the last SDU part), which totals 12 bytes, to the bandwidth request quantity corresponding to the CID of the received PDU. Accordingly, the bandwidth request quantity is increased to 48 bytes.

Then, the BS allocates a wireless bandwidth equivalent to the remaining bandwidth request quantity of 48 bytes to the MS. At this stage, the BS recognizes that the bandwidth request quantity remaining is 0 bytes (SQ8).

When the MS is allocated a bandwidth of 48 bytes, the MS transmits a PDU including a SDU of 36 bytes to the BS (SQ9).

Hence, in the above-described example of FIG. 21, the BS allocates a bandwidth being 38 bytes more than the 1510 bytes requested by the MS. Thus, it can be said that the total bandwidth to be allocated to the MS is updated in an increasing direction due to fragmentation.

Although only the FSH is taken into account as a subheader in the above-described example, when there are other subheaders (e.g., Grant Management Subheader) included in the received PDU, the other subheaders are also taken into account and added to the bandwidth request quantity. Furthermore, in a case where the PDU is subject to encryption, the PDU may also include a Packet Number and/or an Authentication Code. In this case, the Packet Number and/or the Authentication Code is also taken into account in the same manner as the header and the trailer and added to the bandwidth request quantity.

<Sequence of Bandwidth Allocation Request/Bandwidth Allocation in a Case of Performing a Packing Process According to a First Embodiment of the Present Invention>

Figure 22:
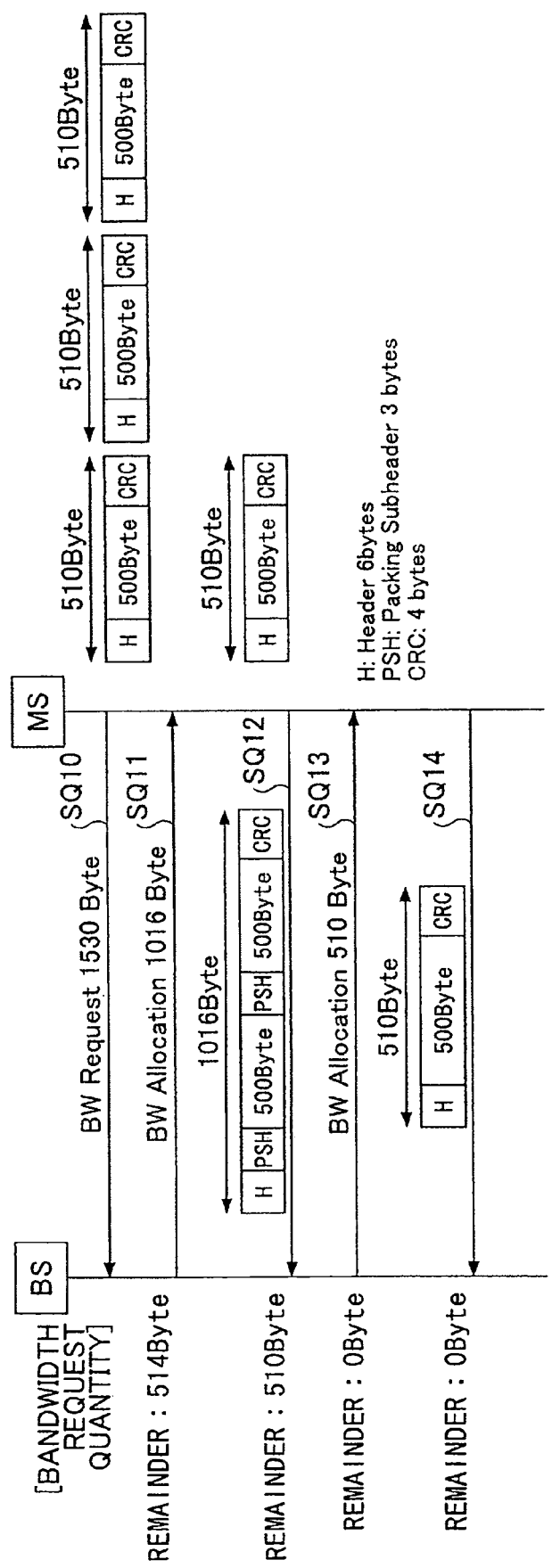
FIG. 22 is a diagram showing a sequence of bandwidth allocation request/bandwidth allocation in a case of performing a packing process according to a first embodiment of the present invention.

FIG. 22 is a diagram showing a sequence of bandwidth allocation request/bandwidth allocation in a case of performing a packing process according to a first embodiment of the present invention. FIG. 22 shows an example where an MS transmits a bandwidth request for transmitting 1530 bytes of data including a header and a trailer (e.g., CRC) to a BS in order to transmit three SDUs of 500 bytes each.

First, the MS requests wireless bandwidth allocation for transmitting PDUs of a total of 1530 bytes (SQ10). In this example, the BS, taking available wireless resources into consideration, allocates a bandwidth of 1016 bytes (SQ11). At this stage, the remaining bandwidth request quantity is 514 bytes.

When a bandwidth of 1016 bytes is allocated from the BS, the MS uses PSHs (packing subheader) to combine two SDUs of 500 bytes each and adds a header and a trailer to the combined SDUs, to thereby generate a PDU of 1016 bytes and transmits the generated PDU to the BS (SQ12).

When the BS receives the PDU of 1016 bytes from the MS, the BS detects that plural combined (packed) SDUs are included in the PDU by referring to the PSH (packing subheader). Then, the BS subtracts data quantity equivalent to the headers and the trailers initially added to the combined SDUs from the data quantity of PSHs added to the SDUs included in the PDU. The value obtained by the subtraction is added to the bandwidth request quantity corresponding to the CID of the PDU. Accordingly, the bandwidth request quantity is reduced to 510 bytes.

Then, the BS allocates a wireless bandwidth equivalent to the remaining bandwidth request quantity of 510 bytes to the MS (SQ13). At this stage, the remaining bandwidth request quantity becomes 0 bytes. Then, the MS uses the allocated wireless bandwidth to transmit the remaining PDU to the BS (SQ14). At this stage, since no packing or fragmentation is performed on the PDU, the BS does not update the bandwidth request quantity.

Hence, in the above-described example of FIG. 22, the BS allocates a bandwidth being 4 bytes less than the 1530 bytes requested by the MS. Thus, it can be said that the total bandwidth to be allocated to the MS is updated in a decreasing direction due to packing.

Since the example of FIG. 22 is aimed to describe a bandwidth allocation operation in a case where a packing process is performed, no fragmentation process is performed on the SDU. However, the packing process may be performed on divided (fragmented) SDU parts. In such a case, the example of FIG. 22 is combined with the example of FIG. 21.

<Sequence of Bandwidth Allocation Request/Bandwidth Allocation in a Case of Performing a Packing Process and a Fragmentation Process According to a First Embodiment of the Present Invention>

Figure 23:
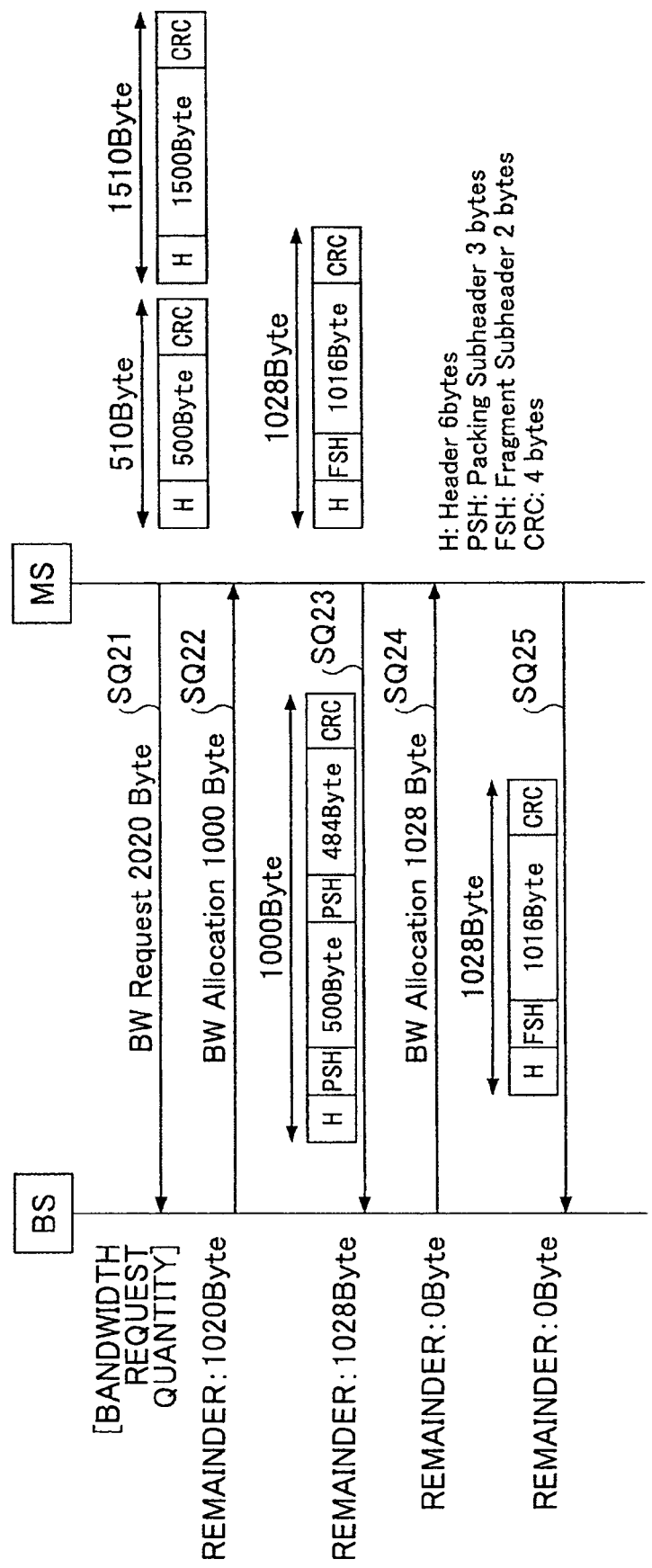
FIG. 23 is a diagram showing a sequence of bandwidth allocation request/bandwidth allocation in a case of performing a packing process and a fragmentation process according to a first embodiment of the present invention.

FIG. 23 is a diagram showing a sequence of bandwidth allocation request/bandwidth allocation in a case of performing a packing process and a fragmentation process according to a first embodiment of the present invention. FIG. 23 shows an example where an MS transmits a bandwidth request for transmitting 2020 bytes of data including a header and a trailer (e.g., CRC) to a BS in order to transmit an SDU of 500 bytes and an SDU of 1500 bytes.

First, the MS requests wireless bandwidth allocation for transmitting a PDU of 2020 bytes (SQ21). In this example, the BS, taking available wireless resources into consideration, allocates a bandwidth of 1000 bytes (SQ22). At this stage, the remaining bandwidth request quantity is 1020 bytes.

When a bandwidth of 1000 bytes is allocated from the BS, the MS uses PSHs (packing subheader) to combine an SDU of 500 bytes and a first SDU part of 484 bytes of the SDU of 1500 bytes and adds a header (H) and a trailer (CRC) to the combined SDUs, to thereby generate a PDU of 1000 bytes and transmit the generated PDU to the BS (SQ23). The FC bits included in the PSH added to the SDU part of 484 bytes are '10' first fragment, and the FC bits added to the SDU part of 1016 bytes remaining in the MS are a '01' last fragment.

When the BS receives the packed (combined) PDU from the MS, the BS detects that plural combined (packed) SDUs are included in the PDU by referring to the PSH and also detects that the SDU in the PDU is divided by referring to the FC bits included in the PSH. In a case where "N" is the number of packed (combined) SDUs, data quantity of "N×PSH−(N−1)×(header+trailer)" is added to the bandwidth request quantity. Since a PSH, instead of an FSH, is added to the first SDU part (first fragment) included in the received PDU, data quantity equivalent to an FSH newly added to the last SDU part remaining in the MS+a header+a trailer is added to the bandwidth request quantity.

In the example of FIG. 23, 8 bytes ({2×3 bytes−(2−1)×(6 bytes+4 bytes)}+{2 bytes+6 bytes+4 bytes}=8) are added to the bandwidth request quantity. Accordingly, the bandwidth request quantity is increased from 1020 bytes to 1028 bytes.

Then, when the BS allocates a wireless bandwidth of 1028 bytes to the MS, the remaining bandwidth request quantity becomes 0 (SQ24). When the BS receives PDU that is transmitted from the MS using the allocated wireless bandwidth (SQ25), the BS, detecting that the PDU includes a last SDU part, does not update the bandwidth request quantity.

Hence, in the above-described example of FIG. 23, although a wireless bandwidth of 2020 bytes is requested by the MS, the BS allocates 8 bytes more than the requested wireless bandwidth. Thus, it can be said that the total wireless bandwidth to be allocated to the MS is updated in an increasing direction due to fragmentation and packing.

<Updating of bandwidth Allocation Request Quantity in a Case of Where a PDU is Received>

Figure 24:
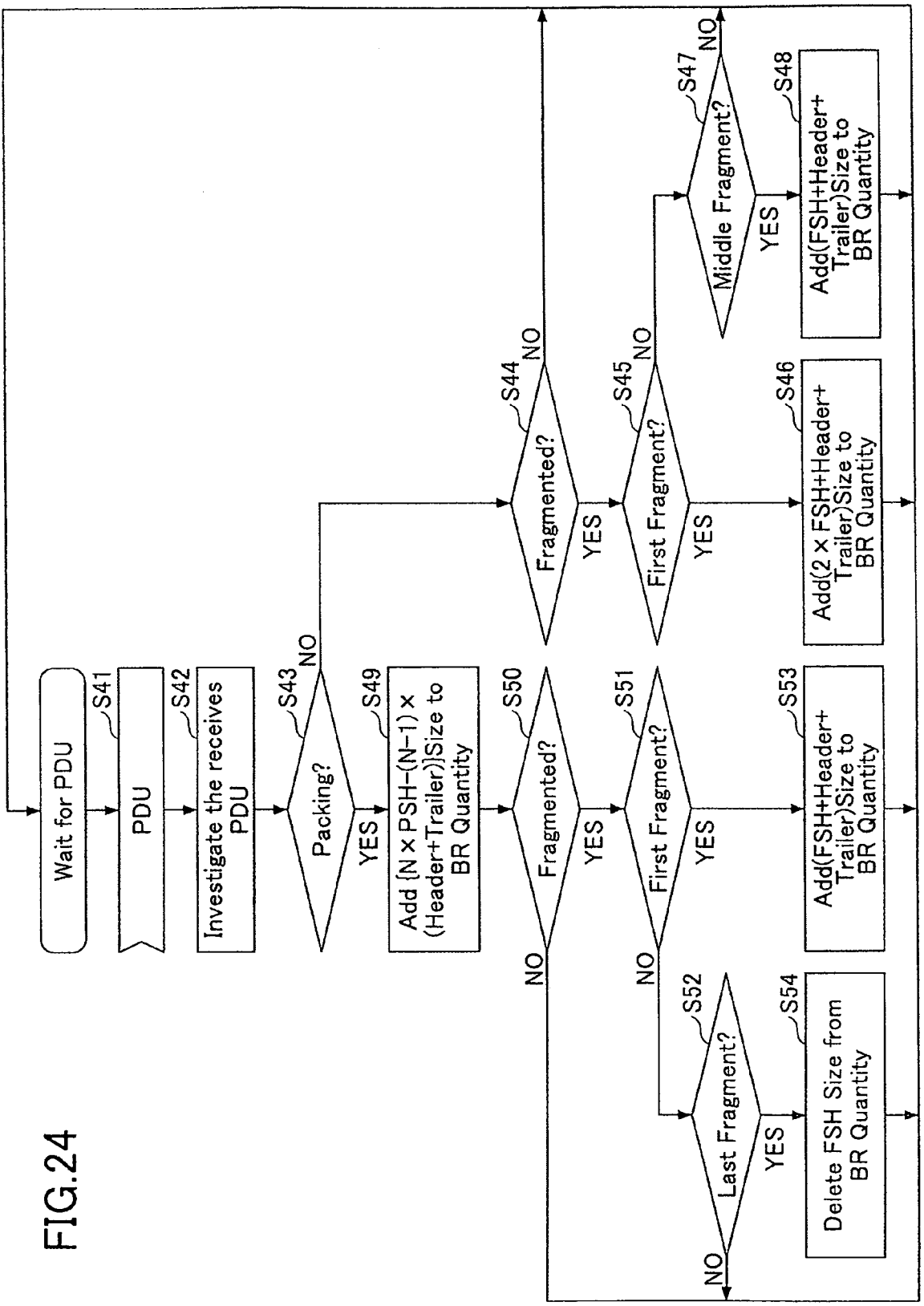
FIG. 24 is a flowchart showing an example of an operation where a BS updates a bandwidth request quantity in a case where a PDU is received according to an embodiment of the present invention.

FIG. 24 is a flowchart showing an example of an operation where a BS updates a bandwidth request quantity in a case where a PDU is received. In FIG. 24, when the BS receives a PDU (Step S41), the BS determines whether the PDU has a PSH for determining whether the PDU includes packed (combined) SDUs (Step S43).

In a case where no packed SDU are included (No in Step S43), the BS determined whether the PDU has a FSH for determining whether the PDU is fragmented (Step S44). In a case where the PDU is not fragmented, the BS does not update the bandwidth request quantity. In this case, the operation returns to Step S41. In a case where the PDU is fragmented, the BS updates the bandwidth request quantity according to the location of the SDU part (first SDU, middle SDU, last SDU) in the manner described in Steps S35-S38 of FIG. 20 (Steps S45-48).

In a case where the PDU includes packed SDUs, the BS updates the bandwidth request quantity by taking into account the data quantity of the increased PSHs and subtracted header and trailer (Step S49). That is, in a case where "N" is the number of packed (combined) SDUs, data quantity of "N×PSH−(N−1)×(header+trailer)" is added to the bandwidth request quantity (anticipated allocation wireless bandwidth).

In a case where a fragmented SDU part is included in the PDU (Step S50), the BS updates the bandwidth request quantity according to the location of the SDU part (first SDU, middle SDU, last SDU). That is, in a case where the fragmented SDU part is a first SDU part (FC bits='10') (Yes in Step S51), a data quantity equivalent to an FSH, a header, and a trailer added to a final SDU part remaining in the MS is added to the bandwidth request quantity (Step S53). In a case where the fragmented SDU part is a last SDU part (FC bits='01') (Yes in Step S52), a data quantity equivalent to its FSH is subtracted (Step S54) in order to correct the data amount of a PSH replacing the FSH in the packing process. In a case where a PDU includes packed SDUs, no middle SDU part would be included in the PDU. Therefore, the operation returns to Step S41.

<Second Embodiment>

In a connection where retransmission control such as Automatic Repeat Request (ARQ) is effective, it is necessary to add a sequence number to a PDU for returning a reception response ACK (reception result message) for notifying the sender which PDU has been received.

This sequence number is included in a FSH or a PSH. An FSH (FC bits='00': No fragment) can be added to a PDU including an SDU(s) that is neither fragmented nor packed. Therefore, the MS requests a wireless bandwidth for transmitting PDU data equivalent to a PDU including a header, an FHS, an SDU, and a trailer.

<Sequence of Bandwidth Allocation Request/Bandwidth Allocation in a Case of Performing a Fragmentation Process According to a Second Embodiment of the Present Invention>

Figure 25:
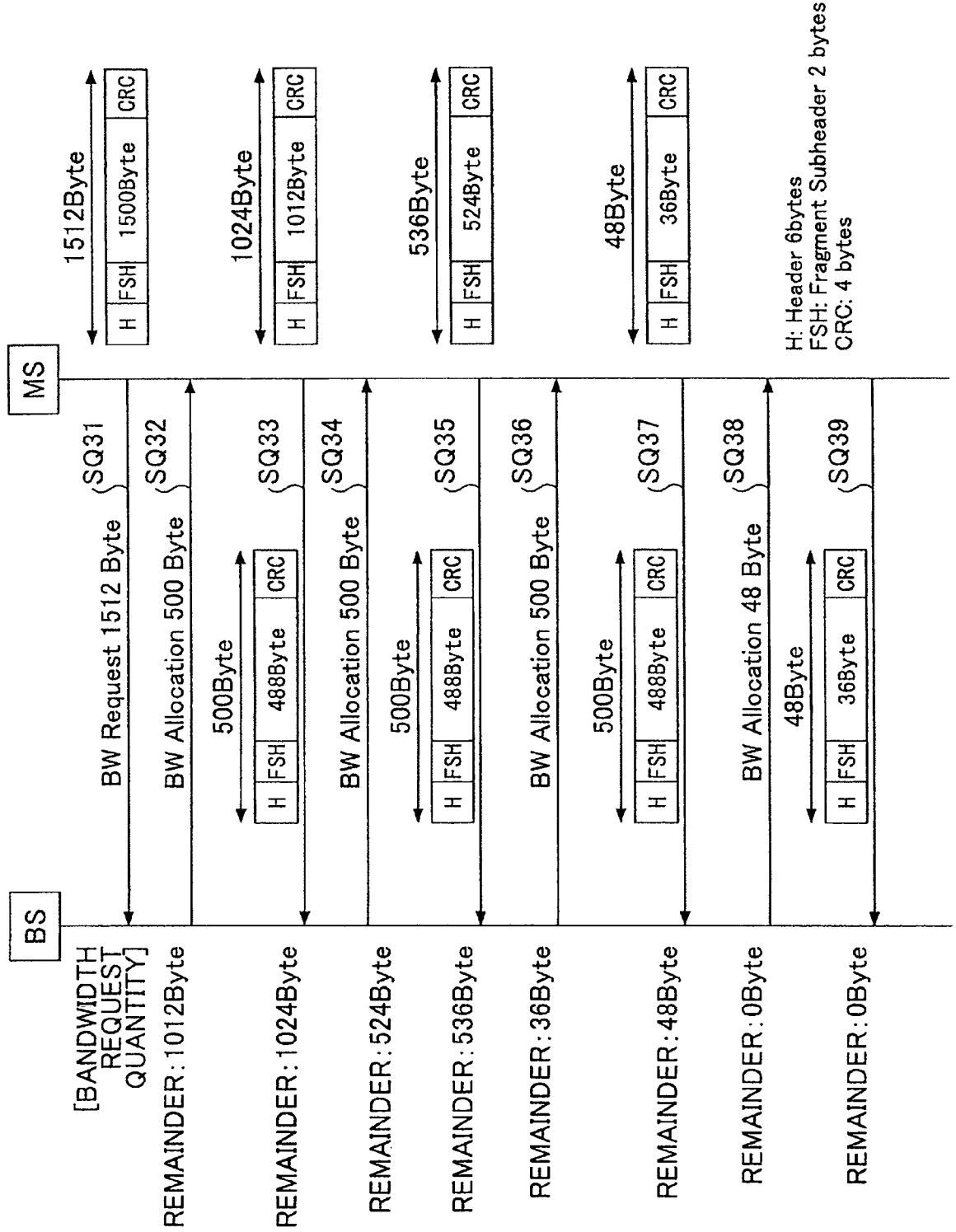
FIG. 25 is a diagram showing a sequence of bandwidth allocation request/bandwidth allocation in a case of performing a fragmentation process according to a second embodiment of the present invention.

FIG. 25 is a diagram showing a sequence of bandwidth allocation request/bandwidth allocation in a case of performing a fragmentation process according to a second embodiment of the present invention. FIG. 25 shows an example where an MS transmits a bandwidth request for transmitting 1512 bytes of data including a header, a trailer (e.g., CRC), and an FSH (FC bits='00': No fragment) to a BS in order to transmit an SDU of 1500 bytes. The FSH is for indicating a Block Sequence Number (BSN).

First, the MS requests a wireless bandwidth allocation for transmitting a PDU of 1512 bytes (SQ31). In this example, the BS, taking available wireless resources into consideration, allocates a bandwidth of 500 bytes (SQ32). At this stage, the remaining bandwidth request quantity is 1012 bytes.

When a bandwidth of 500 bytes is allocated from the BS, the MS divides the SDU of 1500 bytes into a first SDU part of 488 bytes and a last SDU part of 1012 bytes, adds a header (H), a trailer (CRC), and a fragment subheader (FSH) to the first SDU part, reconstructs a PDU of 500 bytes, and transmits the PDU to the BS (SQ33). In the same manner, another PDU is generated by adding a header, a trailer, and a fragment subheader to the last SDU part of 1012 bytes. The FC bits of the FSH added to the first SDU part are a '10' first fragment, and the FC bits of the FSH added to the last SDU part are a '01' last fragment.

When the BS receives the PDU of 500 bytes from the MS, the BS detects that the first SDU part is included in the PDU by referring to the FSH (FC bits='10' first fragment). Then, the BS adds the data quantity of the header, the trailer, and the FSH added to the SDU remaining in the MS (header, trailer, FSH added to the last SDU part), which totals 12 bytes, to the bandwidth request quantity corresponding to the CID of the received PDU. Accordingly, the bandwidth request quantity is increased to 1024 bytes.

Then, the BS allocates 500 bytes of bandwidth from the 1024 bytes of bandwidth request quantity to the MS (SQ34). At this stage, the BS recognizes that the bandwidth request quantity remaining is 524 bytes.

When the MS is allocated a bandwidth of 500 bytes, the MS further divides the SDU of 1012 bytes into a middle SDU part of 488 bytes and a last SDU part of 524 bytes. Then, a header, a trailer, and a FSH (FC bits='11' Middle fragment) are added to the middle SDU part, to thereby generate a PDU. In the same manner, a header, a trailer, and a FSH (FC bits='01' Last fragment) are added to the last SDU part, to thereby generate another PDU. Then, the PDU including the middle SDU part is transmitted to the BS (SQ35).

When the BS receives the PDU of 500 bytes from the MS, the BS detects that the middle SDU part is included in the PDU by referring to the FSH (FC bits='11' Middle fragment). Then, the BS adds the data quantity of the header, the trailer, and the FSH added to the SDU remaining in the MS, which totals 12 bytes, to the bandwidth request quantity corresponding to the CID of the received PDU. Accordingly, the bandwidth request quantity is increased to 536 bytes.

When the MS is allocated a bandwidth of 500 bytes (SQ36), the MS further divides the SDU of 524 bytes into a middle SDU part of 488 bytes and a last SDU part of 36 bytes. Then, a header, a trailer, and a FSH (FC bits='11' Middle fragment) are added to the middle SDU part, to thereby generate a PDU. In the same manner, a header, a trailer, and a FSH (FC bits='01' Last fragment) are added to the last SDU part, to thereby generate another PDU. Then, the PDU including the middle SDU part is transmitted to the BS (SQ37).

When the BS receives the PDU of 500 bytes from the MS, the BS detects that the middle SDU part is included in the PDU by referring to the FSH (FC bits='11' Middle fragment). Then, the BS adds the data quantity of the header, the trailer, and the FSH added to the SDU remaining in the MS, which totals to 12 bytes, to the bandwidth request quantity corresponding to the CID of the received PDU. Accordingly, the bandwidth request quantity is increased to 48 bytes.

Then, the BS allocates a wireless bandwidth equivalent to the remaining bandwidth request quantity of 48 bytes to the MS. At this stage, the BS recognizes that the bandwidth request quantity remaining is 0 bytes (SQ38).

When the MS is allocated a bandwidth of 48 bytes, the MS transmits a PDU including a SDU of 36 bytes to the BS (SQ39).

<Sequence of Bandwidth Allocation Request/Bandwidth Allocation in a Case of Performing a Packing Process According to a Second Embodiment of the Present Invention>

Figure 26:
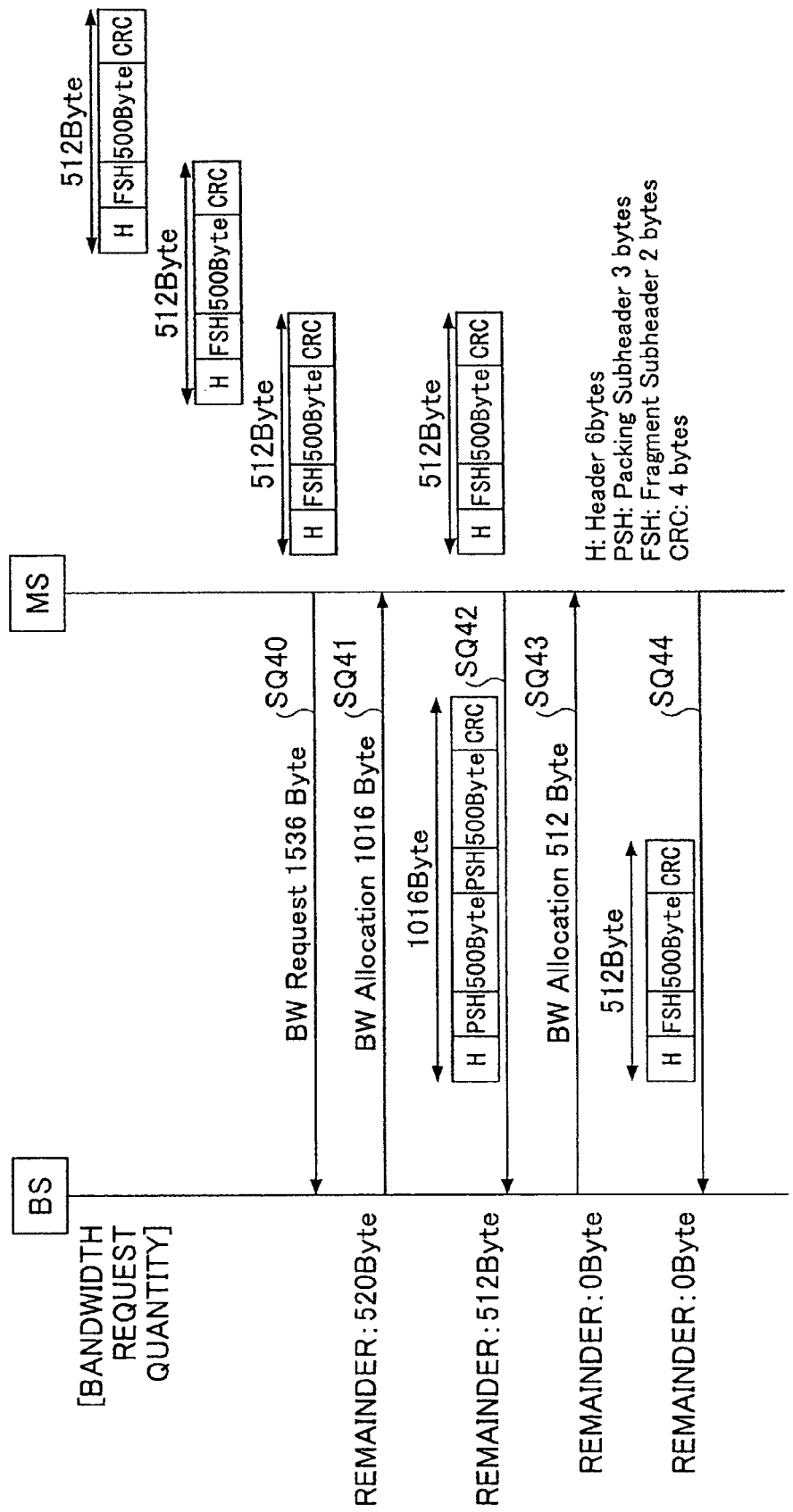
FIG. 26 is a diagram showing a sequence of bandwidth allocation request/bandwidth allocation in a case of performing a packing process according to a second embodiment of the present invention.

FIG. 26 is a diagram showing a sequence of bandwidth allocation request/bandwidth allocation in a case of performing a packing process according to a second embodiment of the present invention. FIG. 26 shows an example where an MS transmits a bandwidth request for transmitting 1536 bytes of data including a header, a trailer (e.g., CRC), and an FSH (FC bits='00': No fragment) to a BS in order to transmit three SDUs of 500 bytes each. The FSH is for indicating a Block Sequence Number (BSN).

First, the MS requests a wireless bandwidth allocation for transmitting a PDU of a total of 1536 bytes (SQ40). In this example, the BS, taking available wireless resources into consideration, allocates a bandwidth of 1016 bytes (SQ41). At this stage, the remaining bandwidth request quantity is 520 bytes.

When a bandwidth of 1016 bytes is allocated from the BS, the MS uses PSHs (packing subheader) to combine two SDUs of 500 bytes each and adds a header and a trailer to the combined SDUs, to thereby generate a PDU of 1016 bytes and transmit the generated PDU to the BS (SQ42).

When the BS receives the PDU of 1016 bytes from the MS, the BS detects that plural combined (packed) SDUs are included in the PDU by referring to the PSH (packing subheader). Then, the BS subtracts a data quantity equivalent to the headers, the trailers and the FSH initially added to the combined SDUs from the data quantity equivalent to the PSHs added to the SDUs included in the PDU. The value obtained by the subtraction is added to the bandwidth request quantity corresponding to the CID of the PDU. Accordingly, the bandwidth request quantity is reduced to 512 bytes.

Then, the BS allocates a wireless bandwidth equivalent to the remaining bandwidth request quantity of 512 bytes to the MS (SQ43). At this stage, the remaining bandwidth request quantity becomes 0 bytes. Then, the MS uses the allocated wireless bandwidth to transmit the remaining PDU to the BS (SQ44). At this stage, since no packing or fragmentation is performed on the PDU, the BS does not update the bandwidth request quantity.

<Updating of Bandwidth Allocation Request Quantity in a Case of Where a PDU is Received>

Figure 27:
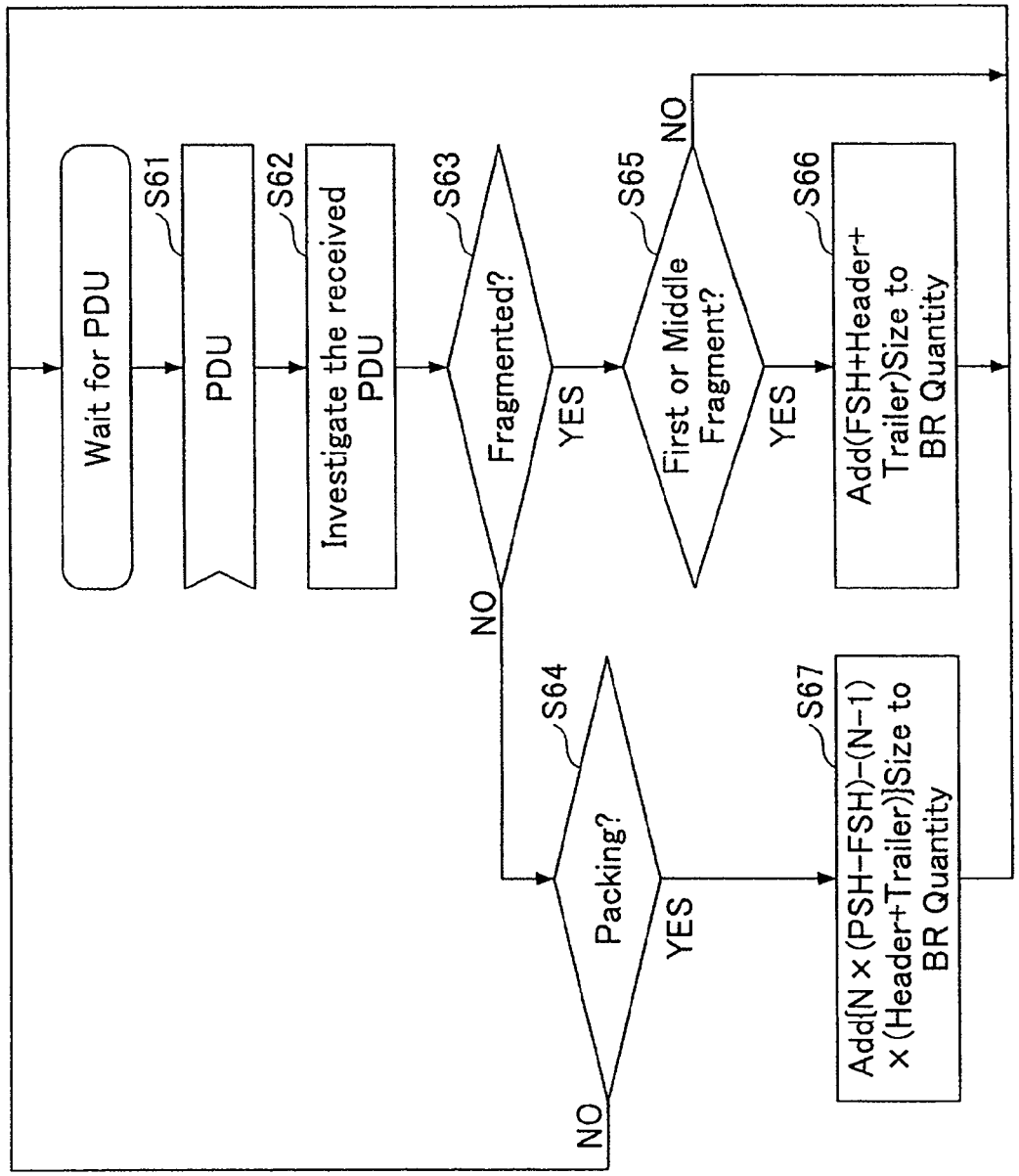
FIG. 27 is a flowchart showing an operation of updating a bandwidth request quantity performed by a BS when the BS receives a PDU according to another embodiment of the present invention.

FIG. 27 is a flowchart showing an example of an operation where a BS updates a bandwidth request quantity in a case where a PDU is received. In FIG. 27, when the BS receives a PDU (Step S61), the BS determines whether the PDU includes a fragmented SDU or a combination (packing) of plural SDUs (Steps S62-S64). In a case where the PDU includes no fragmented SDU or packed SDU (No in Step S64), the BS does not update the bandwidth request quantity. In this case, the operation returns to Step S61.

In a case where the PDU includes a fragmented SDU part, the BS updates the bandwidth request quantity according to the FC bit value of the FSH of the PDU.

(1) In a Case Where FC Bits='10' First Fragment or FC Bits='11' Middle Fragment

In this case, an amount equivalent to a FSH, a header, and a trailer added to the last SDU part is the newly generated (occurring) data quantity. Therefore, a quantity of "FSH+header+trailer" is added to the bandwidth request quantity (Steps S66).

(2) In a Case Where FC Bits='01' Last Fragment

In this case, no new data are generated. Therefore, updating of the bandwidth request quantity is not performed, and the operation returns to Step S61 (Step S65).

In a case where plural SDUs are packed into the received PDU, an amount equivalent to the PSHs (packing subheader) added to each of the SDUs (instead of the FSH) is the newly generated (occurring) data quantity. In addition, an amount equivalent to the headers and trailers initially added to the packed SDU is a data quantity that is to be reduced (Step S67). That is, in a case where the number of SDUs included in the PDU is N, an amount equivalent to "N×(PSH-FSH)−(N−1)×(header+trailer)" is added to the bandwidth request quantity. Normally, a relationship of "N×(PSH-FSH)<(N−1)×(header+trailer)" is satisfied. Therefore, the bandwidth request quantity usually decreases.

<Sequence of Bandwidth Allocation Request/Bandwidth Allocation in a Case of Performing a Packing Process and a Fragmentation Process According to a Second Embodiment of the Present Invention>

Figure 28:
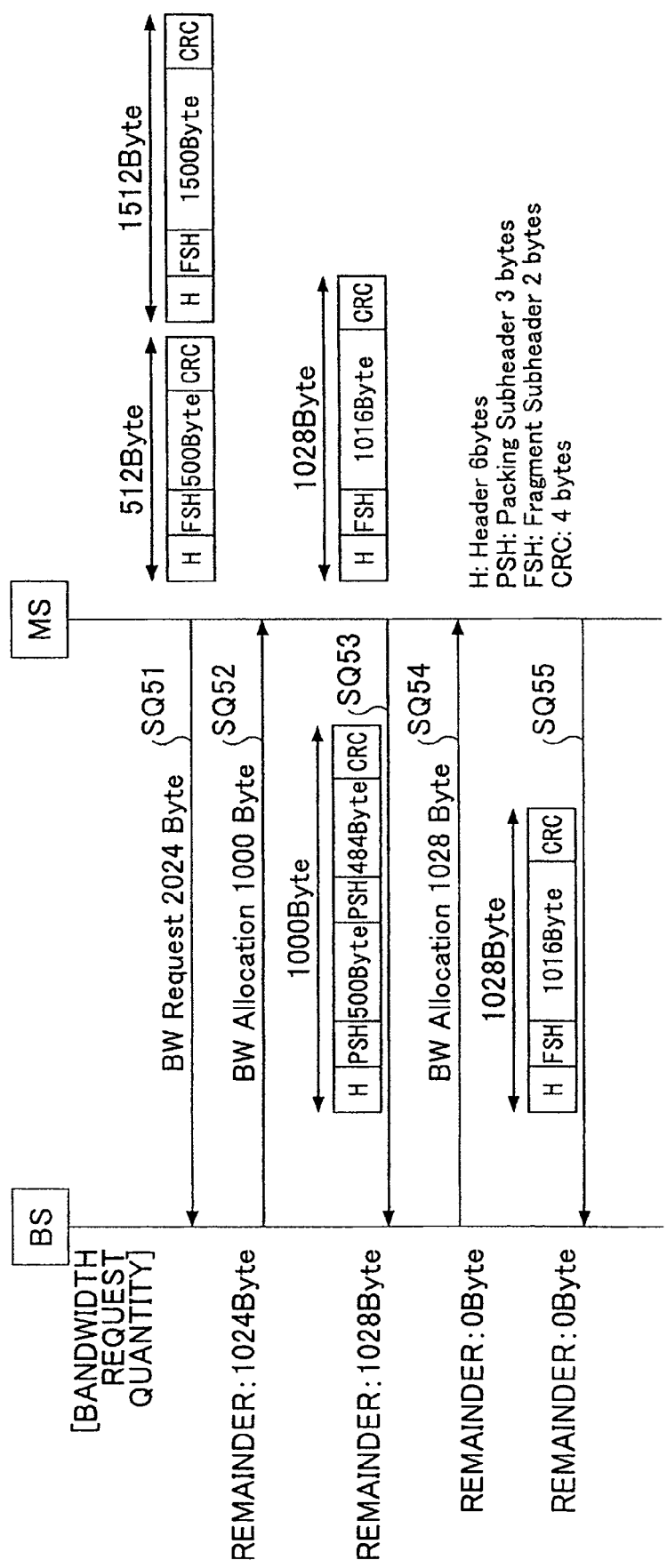
FIG. 28 is a diagram showing a sequence of bandwidth allocation request/bandwidth allocation in a case of performing a packing process and a fragmentation process according to a second embodiment of the present invention.

FIG. 28 is a diagram showing a sequence of bandwidth allocation request/bandwidth allocation in a case of performing a packing process and a fragmentation process according to a second embodiment of the present invention. FIG. 28 shows an example where an MS transmits a bandwidth request for transmitting 2024 bytes of data including a header, a trailer (e.g., CRC), and an FSH (FC bits='00': No fragment) to a BS in order to transmit an SDU of 500 bytes and an SDU of 1500 bytes. The FSH is for indicating a Block Sequence Number (BSN).

First, the MS requests a wireless bandwidth allocation for transmitting a PDU of 2024 bytes (SQ51). In this example, the BS, taking available wireless resources into consideration, allocates a bandwidth of 1000 bytes (SQ52). At this stage, the remaining bandwidth request quantity is 1024 bytes.

When a bandwidth of 1000 bytes is allocated from the BS, the MS uses PSHs (packing subheader), instead of the FSH, to combine an SDU of 500 bytes and a first SDU part of 484 bytes of the SDU of 1500 bytes and adds a header (H) and a trailer (CRC) to the combined SDUs, to thereby generate a PDU of 1000 bytes and transmit the generated PDU to the BS (SQ53). The FC bits included in the PSH added to the SDU part of 484 bytes are a '10' first fragment, and the FC bits added to the SDU part of 1016 bytes remaining in the MS are a '01' last fragment.

When the BS receives the packed (combined) PDU from the MS, the BS detects that plural combined (packed) SDUs are included in the PDU by referring to the PSH and also detects that the SDU in the PDU is divided by referring to the FC bits included in the PSH. In a case where "N" is the number of packed (combined) SDUs, a data quantity of "N×(PSH-FSH)−(N−1)×(header+trailer)" is added to the bandwidth request quantity. Since a PSH, instead of an FSH, is added to the first SDU part (first fragment) included in the received PDU, a data quantity equivalent to an FSH newly added to the last SDU part remaining in the MS+a header+a trailer is added to the bandwidth request quantity.

In the example of FIG. 28, 4 bytes ({2×(3 bytes−2 bytes)−(2−1)×(6 bytes+4 bytes)}+{2 bytes+6 bytes+4 bytes}=4) are added to the bandwidth request quantity. Accordingly, the bandwidth request quantity is increased from 1024 bytes to 1028 bytes.

Then, when the BS allocates a wireless bandwidth of 1028 bytes to the MS, the remaining bandwidth request quantity becomes 0 (SQ54). When the BS receives a PDU that is transmitted from the MS using the allocated wireless bandwidth (SQ55), the BS, detecting that the PDU includes a last SDU part, does not update the bandwidth request quantity.

<Updating of Bandwidth Allocation Request Quantity in a Case of Where a PDU is Received According to a Second Embodiment of the Present Invention>

Figure 29:
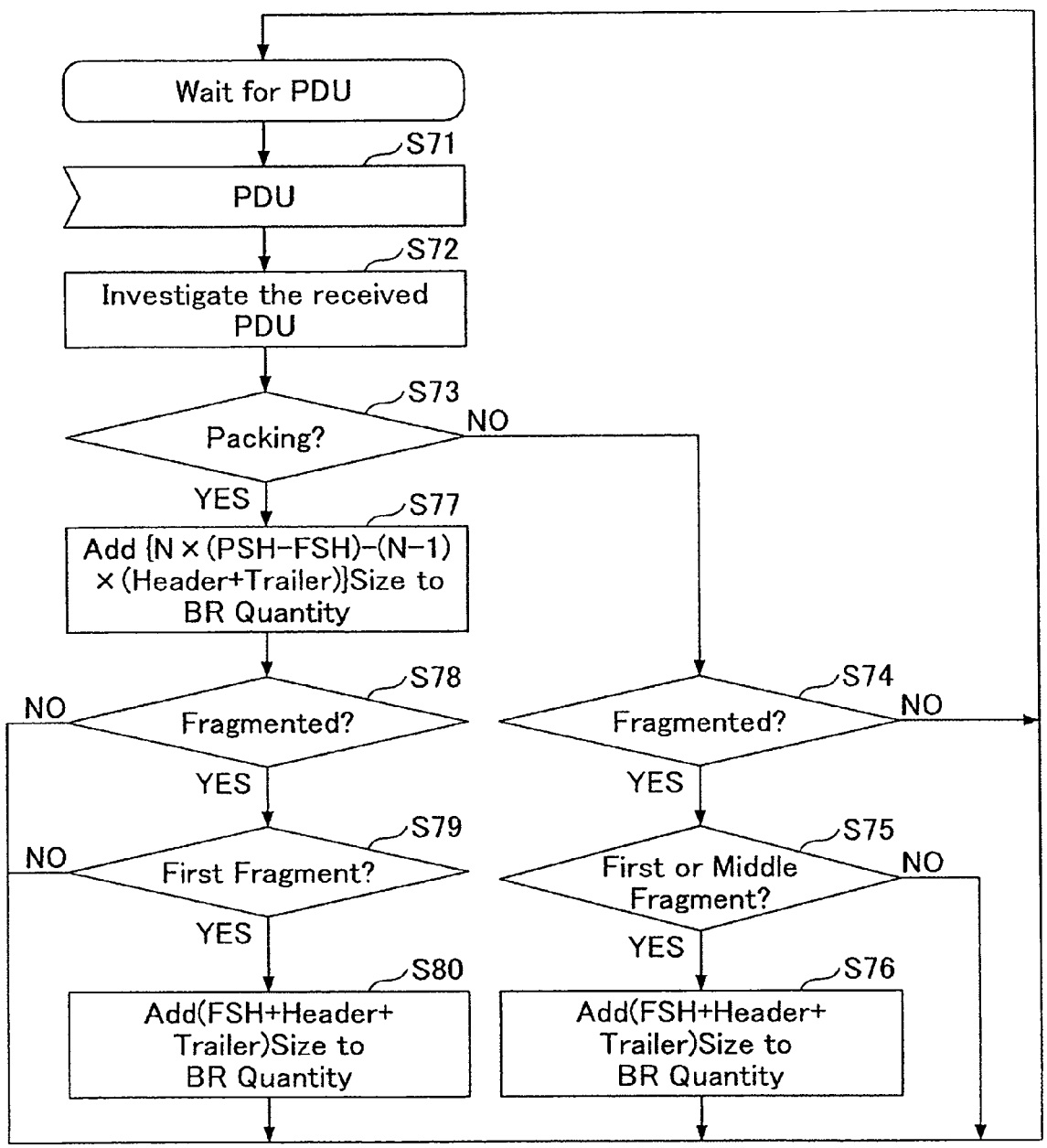
FIG. 29 is a flowchart showing an example of an operation where a BS updates a bandwidth request quantity in a case where a PDU is received according to a second embodiment of the present invention.

FIG. 29 is a flowchart showing an example of an operation where a BS updates a bandwidth request quantity in a case where a PDU is received according to a second embodiment of the present invention. In FIG. 29, when the BS receives a PDU (Step S71), the BS determines whether the PDU has a PSH for determining whether the PDU includes packed (combined) SDUs (Step S72-S73).

In a case where no packed SDUs are included (No in Step S73), the BS determines whether the PDU has a FSH for determining whether the PDU is fragmented (Step S74). In a case where the PDU is not fragmented, the BS does not update the bandwidth request quantity. In this case, the operation returns to Step S71.

In a case where the PDU is fragmented, the BS updates the bandwidth request quantity according to the FC bit value of the FSH of the PDU.

(1) In a Case Where FC Bits='10' First Fragment or FC Bits='11' Middle Fragment

In this case, an amount equivalent to a FSH, a header, and a trailer added to the last SDU part is the newly generated (occurring) data quantity. Therefore, a quantity of "FSH+header+trailer" is added to the bandwidth request quantity (Step S76).

(2) In a Case Where FC Bits='01' Last Fragment

In this case, no new data are generated. Therefore, updating of the bandwidth request quantity is not performed, and the operation returns to Step S71 (Step S75).

In a case where plural SDUs are packed into the received PDU, an amount equivalent to the PSHs (packing subheader) added to each of the SDUs (instead of the FSH) is the newly generated (occurring) data quantity. In addition, an amount equivalent to the headers and trailers initially added to the packed SDU is a data quantity that is to be reduced. That is, in a case where the number of SDUs included in the PDU is N, an amount equivalent to "N×(PSH-FSH)−(N−1)×(header+trailer)" is added to the bandwidth request quantity (Step S77).

In a case where fragmented SDUs are packed and the location of the fragmented SDUs is the middle part or the last part, no new data are generated (occurs). Therefore, the operation returns to Step S71 without updating the bandwidth request quantity (No in Step 79).

In a case where fragmented SDUs are packed and the location of the fragmented SDUs is the first part, an amount equivalent to a FSH, a header, and a trailer added to the last SDU part is the newly generated (occurring) data quantity. Therefore, a quantity of "FSH+header+trailer" is added to the bandwidth request quantity (Step S79-S80).

<Third Embodiment>

In order for the MS to return an ARQ_ACK in response to an ARQ, it is necessary to report control data (e.g., piggyback request, BR header) to the BS. The following third embodiment of the present invention describes an exemplary operation of updating the bandwidth request quantity in a case where control data regarding ARQ_ACK are received.

<Sequence of Bandwidth Allocation Request/Bandwidth Allocation in a Case of Performing a Fragmentation Process According to a Third Embodiment of the Present Invention>

Figure 30:
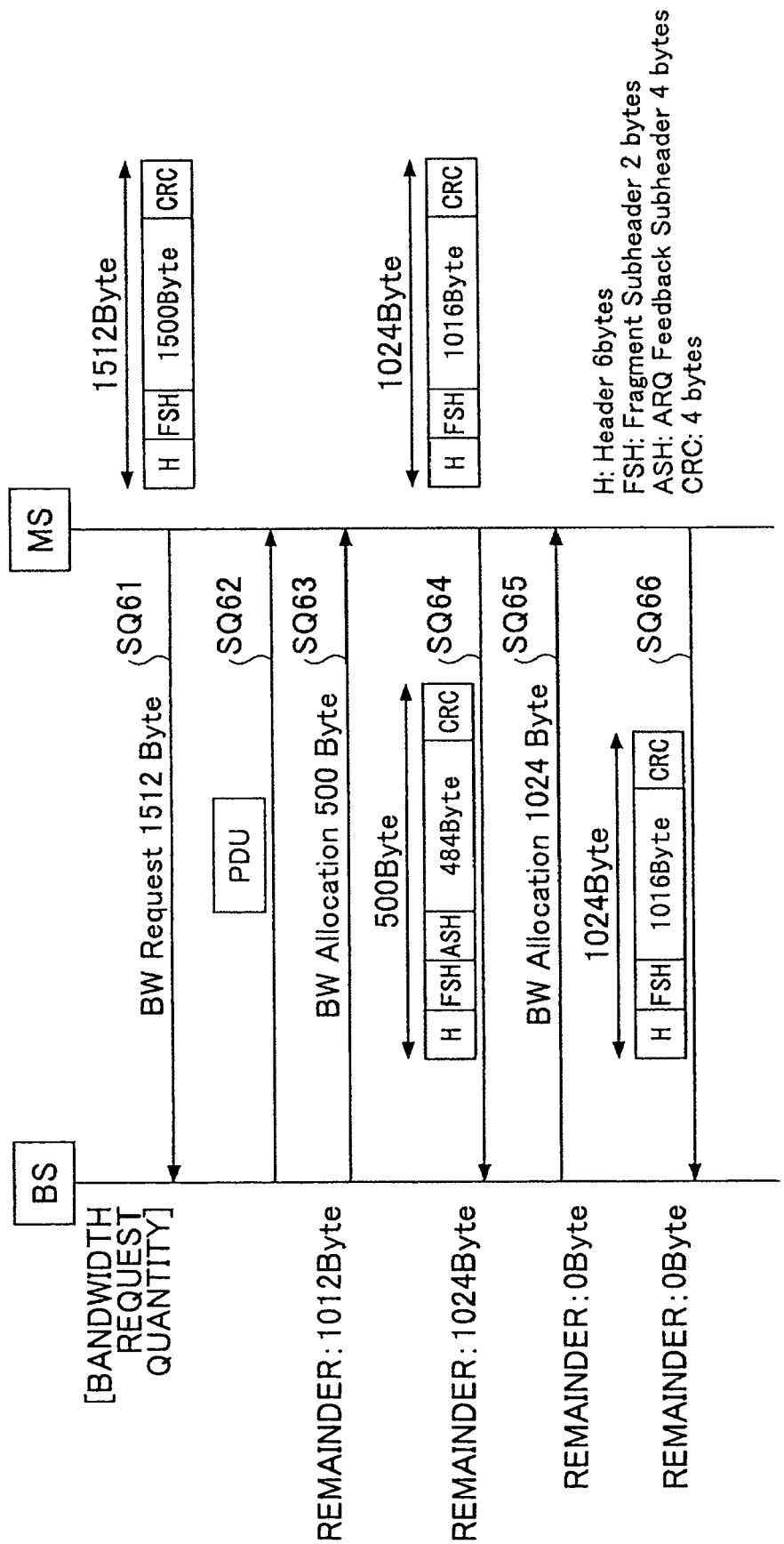
FIG. 30 is a diagram showing a sequence of bandwidth allocation request/bandwidth allocation in a case of performing a fragmentation process according to a third embodiment of the present invention.

FIG. 30 is a diagram showing a sequence of bandwidth allocation request/bandwidth allocation in a case of performing a fragmentation process according to a third embodiment of the present invention. FIG. 30 shows an example where an MS transmits a bandwidth request for transmitting 1512 bytes of data including a header, a trailer (e.g., CRC), and an FSH (FC bits='00': No fragment) to a BS in order to transmit an SDU of 1500 bytes. The FSH is for indicating a Block Sequence Number (BSN).

First, the MS requests a wireless bandwidth allocation for transmitting a PDU of 1512 bytes (SQ61). When the MS receives a PDU having an effective ARQ from the BS (SQ62) and is able to transmit a reception response ACK to the BS, the BS allocates a wireless bandwidth of 500 bytes to the MS (SQ63). At this stage, the remaining bandwidth request quantity is 1012 bytes.

When the bandwidth of 500 bytes is allocated from the BS, the MS divides the SDU of 1500 bytes into a first SDU part of 484 bytes and a last SDU part of 1016 bytes, adds a header (H), a trailer (CRC), a fragment subheader (FSH), and an ARQ Feedback subheader (ASH) to the first SDU part, reconstructs a PDU of 500 bytes, and transmits the PDU to the BS (SQ64).

In this case, the ASH includes, for example, a Sequence Number or a CID of the PDU received by the MS and has a length of 4 bytes. In a similar manner, another PDU is generated by adding a header, a trailer, and a fragment subheader to the last SDU part of 1016 bytes. The FC bits of the FSH added to the first SDU part are a '10' first fragment, and the FC bits of the FSH added to the last SDU part are a '01' last fragment.

When the BS receives the PDU of 500 bytes from the MS, the BS first detects that a subheader other than an FSH or a PSH is included in the PDU. In this example, the BS detects that the PDU includes an ASH. Then, the BS adds data quantity equivalent to the ASH to the bandwidth request quantity. Then, the BS detects that the first SDU part is included in the PDU by referring to the FSH (FC bits='10' first fragment). Then, the BS adds data quantity of the header, the trailer, and the FSH added to the SDU remaining in the MS (header, trailer, FSH added to the last SDU part), which totals 12 bytes, to the bandwidth request quantity corresponding to the CID of the received PDU. Accordingly, the bandwidth request quantity is increased to 1024 bytes.

Then, the BS allocates 1024 bytes of bandwidth to the MS (SQ65). At this stage, the remaining bandwidth request quantity becomes 0 bytes. Then, the MS uses the allocated wireless bandwidth to transmit the remaining PDU to the BS (SQ66). Then the BS, detecting that the received PDU includes the last SDU part, does not update the bandwidth request quantity.

<Process of Updating Bandwidth Request Quantity by BS when Receiving PDU Having Subheader Other than FSH or PSH>

Figure 31:
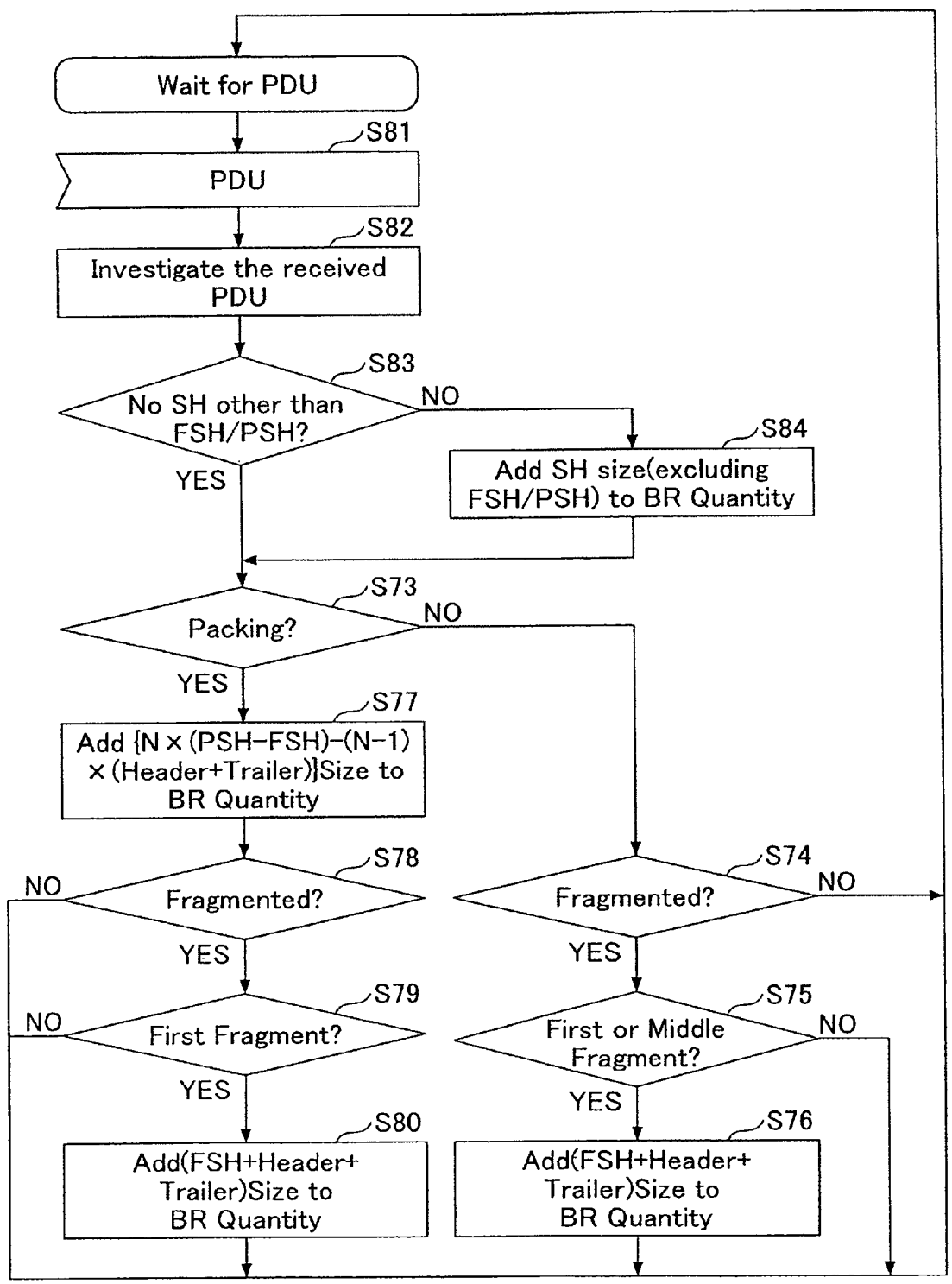
FIG. 31 is a flowchart showing an operation of updating a bandwidth request quantity performed by a BS when the BS receives a PDU having a subheader other than an FSH or a PSH according to an embodiment of the present invention.

FIG. 31 is a flowchart showing an operation of updating a bandwidth request quantity performed by a BS when the BS receives a PDU having a subheader other than an FSH or a PSH.

When the BS receives a PDU (Step S81), the BS determines whether the PDU includes a subheader other than a FSH or a PSH (Steps S82, S83). In a case where the PDU includes a subheader other than a FSH or a PSH such as an ARQ Feedback subheader (No in Step S83), the BS adds data quantity equivalent to the subheader to the bandwidth request quantity (Step S84). The steps following Step S84 are basically the same as those of the above-described second embodiments of the present invention where the bandwidth request quantity is updated depending on whether the PDU includes a fragmented or packed SDU.

FIG. 31 is basically a drawing where a step of determining whether a subheader other than a FSH or a PSH is included in a PDU (Step S82, S83) and a step of adding data quantity equivalent to the subheader (e.g., ARQ Feedback subheader) to the bandwidth request quantity (Step S84) are added to the flowchart of FIG. 29. The steps may also be included in other flowcharts described above.

<ARQ Feedback Subheader>

The ARQ is a MAC layer function for reporting to the sender (transmitter) side whether there are any packet errors in a wireless section (ACK: Acknowledgement) and retransmitting data when there is an error. The ARQ feedback subheader (ASH) is used to transmit the ACK. Another method for transmitting the ARQ ACK is an ARQ Feedback Message of a MAC Management message.

Figure 32:
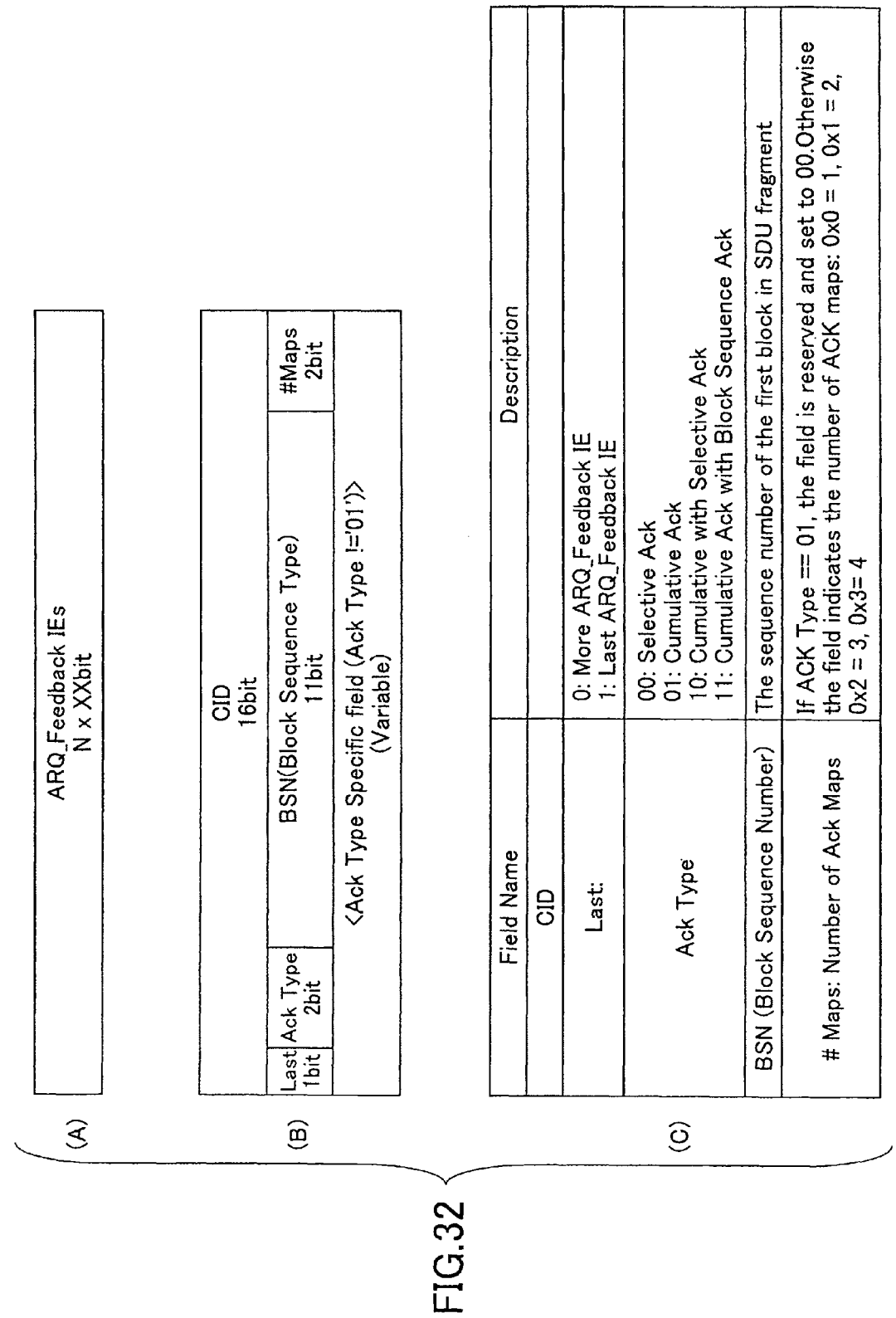
FIG. 32 is a schematic diagram for describing an ARQ Feedback subheader (ASH) according to an embodiment of the present invention.

FIG. 32(A) shows a format of an ARQ Feedback subheader (ASH). As shown in FIG. 32(A), the ASH includes plural ARQ_Feedback-IEs. Each ARQ_Feedback-IE represents an ARQ_ACK of a CID. FIG. 32(B) shows a format of an ARQ_Feedback-IE. FIG. 32(C) is a diagram for describing the fields of an ARQ_Feedback-IE.

As shown in FIG. 32(C), there are four types of ARQ_ACK (meaning and corresponding fields of each ARQ_ACK type are described below). The BSN (Block Sequence Number) is provided in an FSH or a PSH of an ARQ-enable connection and represent a sequence number of an ARQ_Block when a MAC-SDU is virtually divided into ARQ-Blocks.

Figure 33:
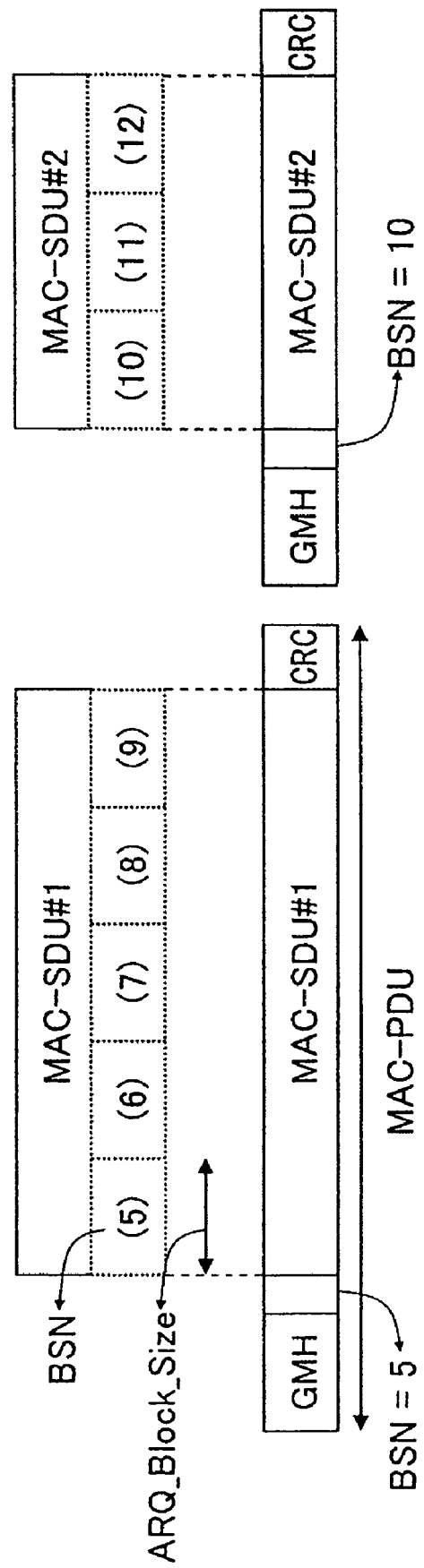
FIG. 33 is a schematic diagram of an ARQ_Block according to an embodiment of the present invention.

FIG. 33 is a schematic diagram of an ARQ_Block. As shown in FIG. 33, a MAC-SDU is divided into parts having an ARQ_Block_Size signaled when connection is established. A BSN of a first ARQ_Block of the SDU is included in an FSH or a PSH. It is to be noted that a fragmentation process is performed in units of ARQ_Block_Size. The BSN included in the ARQ_ACK basically indicates the number of normally received MAC-PDUs. In order to confirm normal reception of the MAC-PDUs, error detection is performed by using CRC (Cyclic Redundancy Code). Therefore, CRC is a necessary function in a case of performing ARQ.

Figure 34:
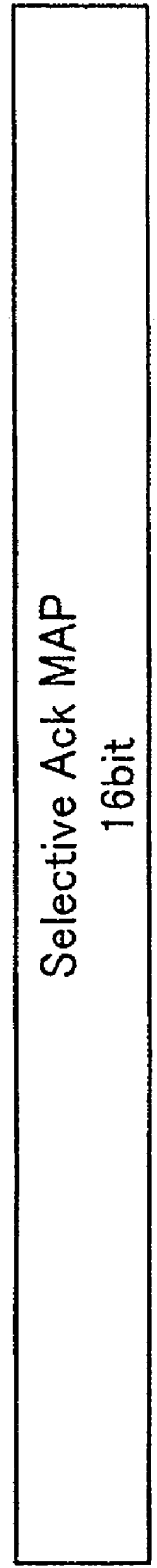
FIG. 34 is a schematic diagram showing a format of a Selective Ack MAP according to an embodiment of the present invention.

FIG. 34 shows a format of a Selective Ack MAP that is applied to a Selective Ack (Ack Type='00') and a Cumulative with Selective Ack (Ack Type='10') among the ARQ Type Specific Fields (see FIG. 32(C)).

The Selective Ack MAP indicates whether each ARQ_Block is received with a bit map. The minimum BSN of the ARQ_Block is MSB. Thus, in a case of the "Selective Ack" type, BSN indicates the MSB of the Selective Ack MAP. In a case of the "Cumulative with Selective Ack" type, BSN indicates the maximum BSN of a successfully received ARQ_Block and also a MSB of the Selective Ack MAP. Therefore, the MSB for the Cumulative with Selective Ack is set to '1'.

Figure 35:
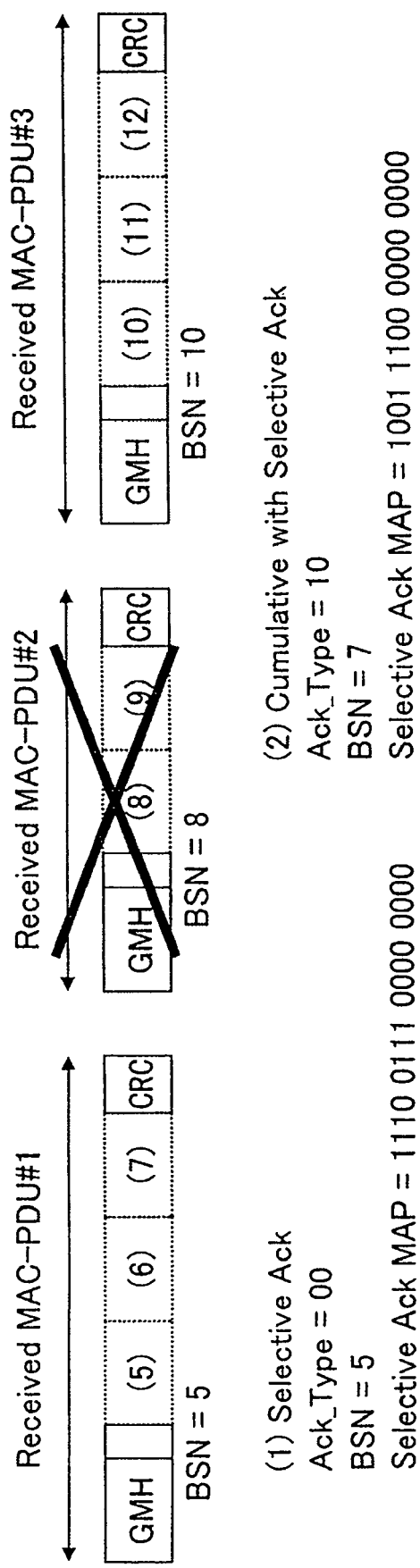
FIG. 35 is a schematic diagram for describing a Selective Ack according to an embodiment of the present invention.

FIG. 35 is a schematic diagram for describing (1) a Selective Ack. FIG. 35 shows a case where the second MAC-PDU (MAC-PDU#2) could not be received, in which Ack Type='00', BSN=5, and Selective Ack MAP="11100111 00000000". In this case, blocks corresponding to BSN=5, 6, 7 are successfully received, subsequent blocks corresponding to BSN=8, 9 are not received, and further subsequent blocks corresponding to BSN=10, 11, and 12 are successfully received.

On the other hand, in a case of (2) a Cumulative with Selective Ack, Ack Type='10' and Selective Ack MAP="10011100 0000000". In this case, a block corresponding to BSN=7 is successfully received, subsequent blocks corresponding to BSN=8, 9 (MAC-PDU#2) are not received, and further subsequent blocks corresponding to BSN=10, 11, and 12 are successfully received.

Figure 36:
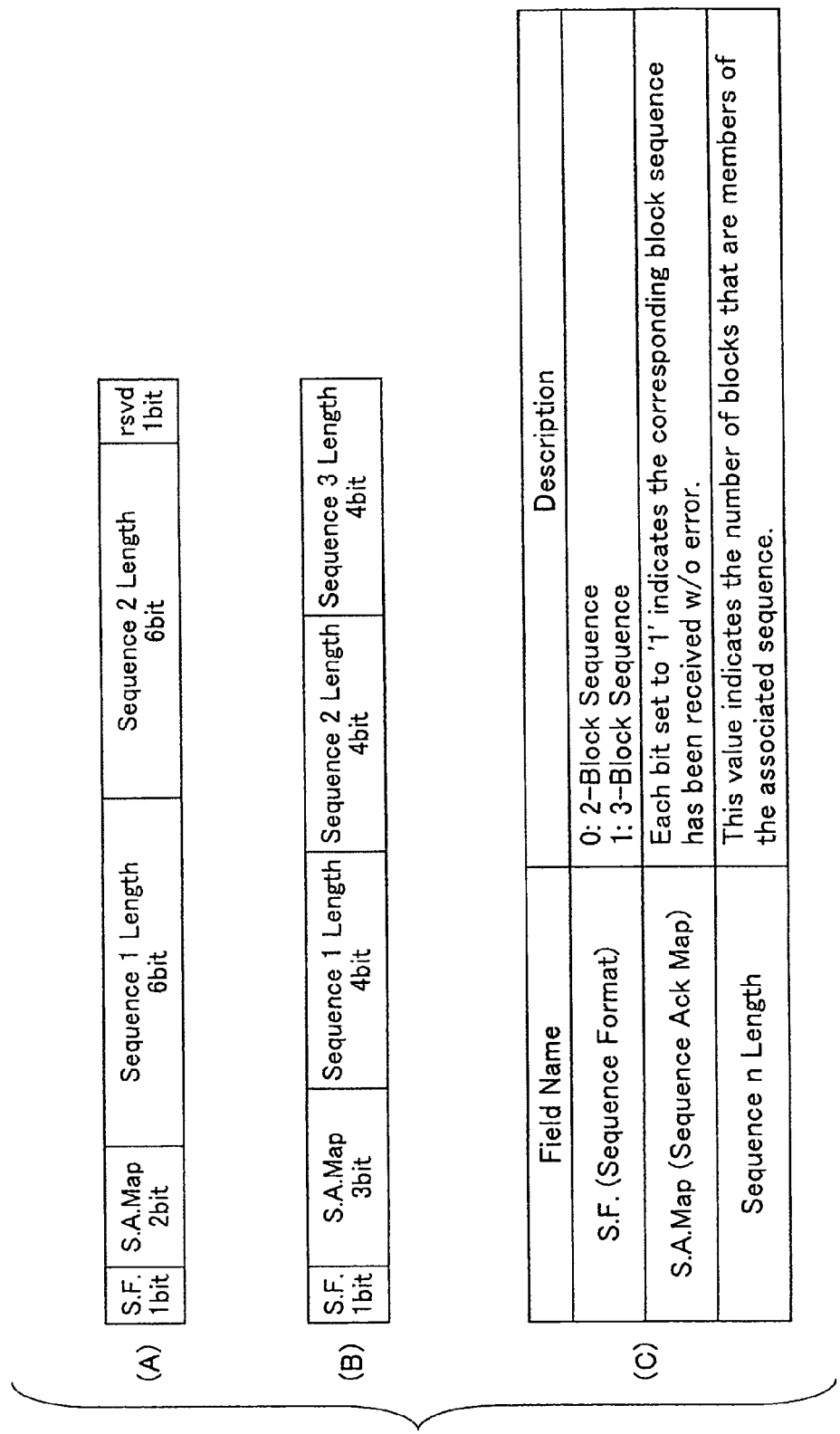
FIG. 36 is a schematic diagram for describing a Block Sequence according to an embodiment of the present invention.

FIGS. 36(A) and 36(B) show formats of a Block Sequence that is applied to a Cumulative Ack with Block Sequence Ack (Ack Type='11') among the ARQ Type Specific Fields (see FIG. 32(C)). FIG. 36(C) is diagram for describing fields of the Block Sequence.

The "Cumulative with Block Sequence Ack" is similar to "Cumulative with Selective Ack". However, the "Cumulative with Selective Ack" type indicates whether each ARQ_Block is received by using bit map whereas the ""Cumulative with Block Sequence Ack" type handles consecutive ARQ_Blocks as a single cluster (Sequence n Length) and indicates whether each cluster is received by adding bits (S.A MAP) to the cluster.

Figure 37:
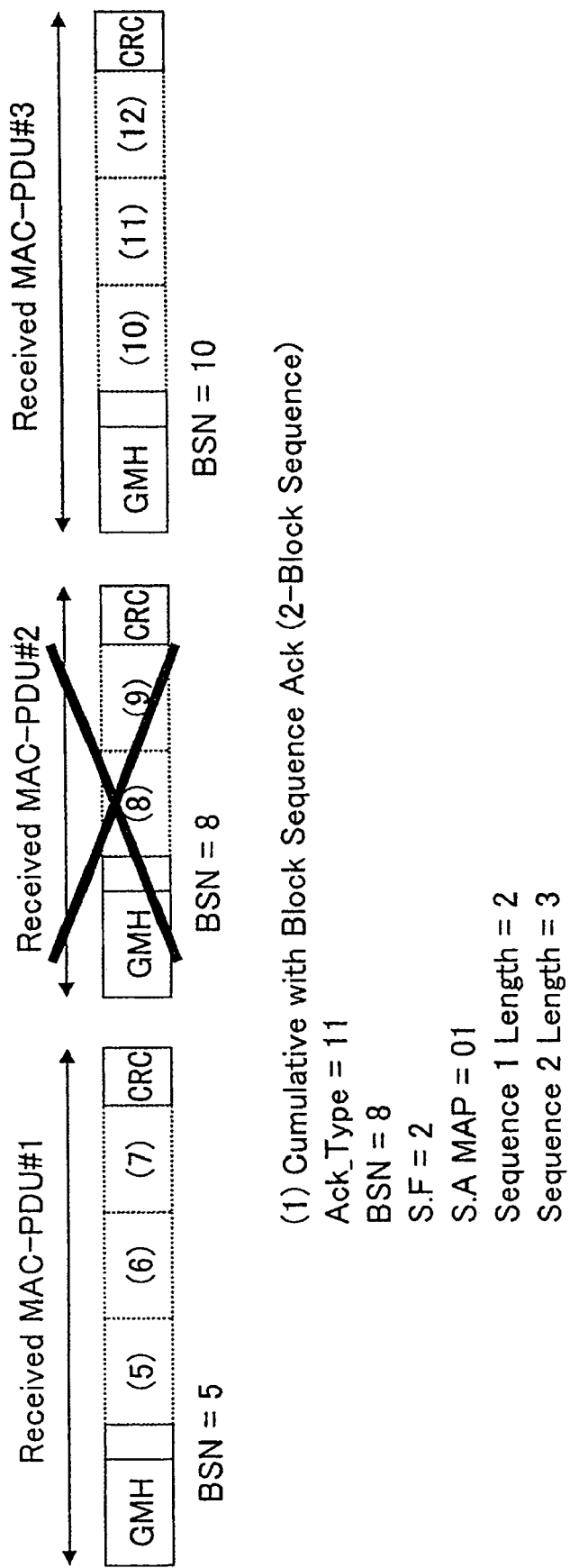
FIG. 37 is a schematic diagram for describing a Block Sequence ACK according to an embodiment of the present invention.

FIG. 37 is a schematic diagram for describing a Block Sequence ACK. FIG. 37 shows a case where the second MAC-PDU (MAC-PDU#2) could not be received, in which Ack Type='11', BSN=8, S.F=2 (equivalent to two PDUs from block 8), S.A MAP=01 (first PDU received but second PDU not received), Sequence1Length=2 (first PDU is two blocks), and Sequence1Length=3 (second PDU is three blocks).

With the above-described embodiments of the present invention, in case where a MS requests a BS to allocate a wireless bandwidth for transmitting data equivalent a PDU including a combination (packing) of plural SDUs or a fragmented SDU, the BS can calculate increased or reduced amount of overhead generated by the packing or fragmentation and update the quantity of the requested bandwidth according to the calculation. Therefore, the MS does not need to make an additional request for bandwidth due to the increased or reduced amount of overhead generated by the packing or fragmentation. Since wasteful bandwidth requests can be prevented, wireless resources can be efficiently used. Furthermore, loss of time due to bandwidth requests can be resolved.

Further, the present invention is not limited to these embodiments, but variations and modifications may be made without departing from the scope of the present invention.

The present application is based on Japanese Priority Application No. 2007-285494 filed on Nov. 1, 2007, with the Japanese Patent Office, the entire contents of which are hereby incorporated herein by reference.

What is claimed is:

1. A wireless base station for allocating a wireless bandwidth to a wireless terminal based on a bandwidth request from the wireless terminal, comprising:
   a receiver configured to receive a target data transmitted in the allocated wireless bandwidth from the wireless terminal, the target data including one or more user packets on which a combining process or a dividing process is performed and control information indicating the combining process or the dividing process; and
   a processor configured to increase or reduce the total quantity of the bandwidth request depending on the control information indicating whether the combining process or the dividing process is performed on the one or more user packets;

wherein the processor is configured to either subtract a data quantity equivalent to an overhead omitted by the combining process from the bandwidth request quantity or add a data quantity equivalent to an overhead generated by the dividing process to the bandwidth request quantity, wherein the data quantity equivalent to the overhead is expressed as "N×PSH−(N−1)×(H+T)" in a case of the combining process and expressed as the data quantity equivalent to the overhead is expressed as "2×FSH+H+T", wherein, "N" indicating the number of user packets, "PSH" indicating a data quantity of the subheader corresponding to combined user packets, "H" indicating a data quantity of a header of the user packets, and "T" indicating a data quantity of a trailer of the user packets, wherein "FSH" indicating a data quantity of the subheader corresponding to divided user packets.

2. The wireless base station as claimed in claim 1, wherein the data regarding the combining process or the dividing process include a header, wherein the processor is configured to increase or reduce the total quantity of the bandwidth request according to the header.

3. The wireless base station as claimed in claim 1, wherein the processor is configured to increase the total quantity of the bandwidth request in a case where the header is related to the dividing process, wherein the processor is configured to reduce the total quantity of the bandwidth request in a case where the header is related to the combining process.

4. The wireless base station as claimed in claim 1, wherein the processor is further configured to manage an anticipated allocation of wireless bandwidth based on the bandwidth request, wherein the processor is configured to reduce the anticipated allocation of wireless bandwidth when the wireless bandwidth is allocated to the wireless terminal, wherein the processor is configured to update the total quantity of the bandwidth request by updating the anticipated allocation of wireless bandwidth.

5. A wireless base station for allocating a wireless bandwidth to a wireless terminal based on a bandwidth request from the wireless terminal, comprising:

a receiver configured to receive target data transmitted in the allocated wireless bandwidth from the wireless terminal, the wireless terminal being capable of including a response message in the target data; and a processor configured to increase the total quantity of the bandwidth request to be allocated to the wireless terminal depending on the response message included in the target data;

wherein a data quantity increased by the processor is equivalent to the response message;

wherein the processor is configured to either subtract a data quantity equivalent to an overhead omitted by the combining process from the bandwidth request quantity or add a data quantity equivalent to an overhead generated by the dividing process to the bandwidth request quantity, wherein the data quantity equivalent to the overhead is expressed as "N×PSH−(N−1)×(H+T)" in a case of the combining process and expressed as the data quantity equivalent to the overhead is expressed as "2×FSH+H+T", wherein, "N" indicating the number of user packets, "PSH" indicating a data quantity of the subheader corresponding to combined user packets, "H" indicating a data quantity of a header of the user packets, and "T" indicating a data quantity of a trailer of the user packets, wherein "FSH" indicating a data quantity of the subheader corresponding to divided user packets.

6. The wireless base station as claimed in claim 5, wherein the response message includes a message indicating a reception result used for retransmission control by the wireless base station.

7. A wireless bandwidth allocating method used in a wireless communications system where user packets are encapsulated and communicated between a wireless base station and a wireless terminal, the method comprising:

a) transmitting a target data from the wireless terminal by using a wireless bandwidth allocated by the wireless base station;

b) receiving the target data including one or more user packets on which a combining process or a dividing process is performed and control information indicating the combining process or the dividing process; and c) increasing or reducing the bandwidth request to be allocated to the wireless terminal by the wireless base station depending on the control information indicating whether the combining process or the dividing process is performed on the one or more user packets;

wherein the increasing or subtracting of the bandwidth request includes either subtracting a data quantity equivalent to an overhead omitted by the combining process from the bandwidth request quantity or adding a data quantity equivalent to an overhead generated by the dividing process to the bandwidth request quantity, wherein the data quantity equivalent to the overhead is expressed as "N×PSH−(N−1)×(H+T)" in a case of the combining process and expressed as the data quantity equivalent to the overhead is expressed as "2×FSH+H+T", wherein, "N" indicating the number of user packets, "PSH" indicating a data quantity of the subheader corresponding to combined user packets, "H" indicating a data quantity of a header of the user packets, and "T" indicating a data quantity of a trailer of the user packets, wherein "FSH" indicating a data quantity of the subheader corresponding to divided user packets.

8. A wireless bandwidth allocating method used in a wireless communications system where user packets are encapsulated and communicated between a wireless base station and a wireless terminal, the method comprising:

a) requesting allocation of a wireless bandwidth for transmitting one or more of the user packets;

b) updating a bandwidth request quantity according to the allocation of the wireless bandwidth requested;

c) allocating the wireless bandwidth to the wireless terminal based on the bandwidth request quantity updated;

d) performing a dividing process or a combining process on the user packets;

d) transmitting the user packets to the wireless base station according to the allocated wireless bandwidth; and e) updating the bandwidth request quantity of the wireless terminal by the wireless base station depending on control information indicating whether the combining process or the dividing process is performed on the user packets;

wherein the updating of the bandwidth request quantity includes either subtracting a data quantity equivalent to an overhead omitted by the combining process from the bandwidth request quantity or adding a data quantity equivalent to an overhead generated by the dividing process to the bandwidth request quantity, wherein the data quantity equivalent to the overhead is expressed as "N×PSH−(N−1)×(H+T)" in a case of the combining process and expressed as the data quantity equivalent to the overhead is expressed as "2×FSH+H+T", wherein, "N" indicating the number of user packets, "PSH" indicating a data quantity of the subheader corresponding to combined user packets, "H" indicating a data quantity of a header of the user packets, and "T" indicating a data quantity of a trailer of the user packets, wherein "FSH" indicating a data quantity of the subheader corresponding to divided user packets.

9. The wireless bandwidth allocating method as claimed in claim 8, wherein in a case where an overhead is generated by the combining process, the bandwidth request quantity is reduced in an amount equivalent to the overhead.

10. The wireless bandwidth allocating method as claimed in claim 8, wherein in a case where an overhead is generated by the dividing process, the bandwidth request quantity is increased in an amount equivalent to the overhead.

11. The wireless bandwidth allocating method as claimed in claim 8, wherein the bandwidth request is generated by adding a header and a trailer to each of the one or more of the user packets.

12. The wireless bandwidth allocating method as claimed in claim 8, further comprising:

adding an overhead of requesting automatic retransmission to the user packets;

wherein the bandwidth request quantity of the wireless terminal is updated considering the overhead added to the user packets.

13. A wireless base station used in a wireless communications system where user packets are encapsulated and communicated between the wireless base station and a wireless terminal, the wireless base station comprising:

a receiver configured to receive a bandwidth request requesting allocation of a wireless bandwidth for transmitting one or more of the user packets; and a processor configured to update a bandwidth request quantity based on the received bandwidth request, allocate the wireless bandwidth to the wireless terminal based on the updated bandwidth request quantity, detect a subheader included in the user packets and, determine whether a dividing process or a combining process is performed on the user packets according to the subheader;

wherein the processor is configured to update the bandwidth request quantity by increasing or reducing the bandwidth request quantity according to the determination of whether the dividing process or the combining process is performed on the user packets;

wherein the processor is configured to either subtract a data quantity equivalent to an overhead omitted by the combining process from the bandwidth request quantity or add a data quantity equivalent to an overhead generated by the dividing process to the bandwidth request quantity, wherein the data quantity equivalent to the overhead is expressed as "N×PSH−(N−1)×(H+T)" in a case of the combining process and expressed as the data quantity equivalent to the overhead is expressed as "2×FSH+H+T", wherein, "N" indicating the number of user packets, "PSH" indicating a data quantity of the subheader corresponding to combined user packets, "H" indicating a data quantity of a header of the user packets, and "T" indicating a data quantity of a trailer of the user packets, wherein "FSH" indicating a data quantity of the subheader corresponding to divided user packets.

14. The wireless base station as claimed in claim 13, wherein when the user packets include the first part of divided packets and other user packets, the processor is configured to add the data quantity of the subheader corresponding to divided user packets and the total of the data quantity of the header and the trailer to the data quantity equivalent to the overhead, wherein when the user packets include the last part of divided user packets and other user packets, the processor is configured to subtract the data quantity of the subheader corresponding to divided user packets from the data quantity equivalent to the overhead.

15. The wireless base station as claimed in claim 13, wherein in a case of transmitting the user packets added with an overhead for Automatic Repeat Request, the data quantity equivalent to the overhead is expressed as "N×(PSH−FSH)−(N−1)×(H+T)", "PSH" indicating a data quantity of the subheader corresponding to combined user packets, "FSH" indicating a data quantity of the subheader corresponding to divided user packets, "H" indicating a data quantity of a header of the user packets, and "T" indicates a data quantity of a trailer of the user packets.

16. The wireless base station as claimed in claim 13, wherein in a case of transmitting the user packets added with an overhead for Automatic Repeat Request, when the user packets include user packets other than a last part of divided user packets, the data quantity equivalent to the overhead is expressed as "FSH+H+T", "FSH" indicating a data quantity of the subheader corresponding to divided user packets, "H" indicating a data quantity of a header of the user packets, and "T" indicating a data quantity of a trailer of the user packets.

17. The wireless base station as claimed in claim 15, wherein when the user packets include the first part of divided packets and other user packets, the processor is configured to add the data quantity of the subheader corresponding to divided user packets and the total of the data quantity of the header and the trailer to the data quantity equivalent to the overhead.

18. The wireless base station as claimed in claim 13, wherein in a case of transmitting the user packets added with an overhead for Automatic Repeat Request, when the user packets include an Automatic Repeat Request feedback subheader, the processor is configured to add the data quantity of the Automatic Repeat Request feedback subheader to the bandwidth request quantity.

* * * * *